United States Patent
Kataoka et al.

(10) Patent No.: US 11,080,488 B2
(45) Date of Patent: Aug. 3, 2021

(54) INFORMATION PROCESSING APPARATUS, OUTPUT CONTROL METHOD, AND COMPUTER-READABLE RECORDING MEDIUM

(71) Applicant: FUJITSU LIMITED, Kawasaki (JP)

(72) Inventors: Masahiro Kataoka, Kamakura (JP); Masao Ideuchi, Hachioji (JP); Tamana Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 16/281,655

(22) Filed: Feb. 21, 2019

(65) Prior Publication Data
US 2019/0286701 A1    Sep. 19, 2019

(30) Foreign Application Priority Data

Mar. 13, 2018 (JP) .............................. JP2018-045892

(51) Int. Cl.
*G06F 40/30* (2020.01)
*G06F 40/242* (2020.01)
*G06F 40/253* (2020.01)

(52) U.S. Cl.
CPC ............ *G06F 40/30* (2020.01); *G06F 40/242* (2020.01); *G06F 40/253* (2020.01)

(58) Field of Classification Search
CPC . G10L 15/26; G10L 15/187; G10L 2015/025; G10L 2015/088; G10L 15/04; G10L 15/183; G10L 15/28; G10L 15/14; G10L 15/02; G10L 15/22; G06F 40/30; G06F 40/242; G06F 40/253; G06F 40/284
See application file for complete search history.

(56) References Cited

U.S. PATENT DOCUMENTS

| | | | | |
|---|---|---|---|---|
| 8,447,608 | B1 * | 5/2013 | Chang | G10L 15/197 704/257 |
| 2007/0225980 | A1 * | 9/2007 | Sumita | G10L 15/1815 704/240 |
| 2008/0294441 | A1 * | 11/2008 | Saffer | G10L 15/28 704/255 |

(Continued)

FOREIGN PATENT DOCUMENTS

| | | |
|---|---|---|
| JP | 2010-55020 A | 3/2010 |
| JP | 2011-180596 A | 9/2011 |

*Primary Examiner* — Huyen X Vo
(74) *Attorney, Agent, or Firm* — Westerman, Hattori, Daniels & Adrian, LLP

(57) ABSTRACT

A non-transitory computer-readable recording medium stores therein an output control program that causes a computer to execute a process including: receiving a phoneme string for a text having a plurality of sentences; determining a sentence corresponding to a specific phoneme or a phoneme string included in the received phoneme string; referring to a storage that stores therein co-occurrence information on sentences for words in association with the words and determining a word the co-occurrence information on the determined sentence of which satisfies a standard among the words; changing the specific phoneme or the phoneme string included in the received phoneme string to the determined word to generate a text corresponding to the received phoneme string; and outputting the generated text.

5 Claims, 19 Drawing Sheets

(56) References Cited

U.S. PATENT DOCUMENTS

| | | | |
|---|---|---|---|
| 2010/0324900 A1* | 12/2010 | Faifkov | G10L 15/12 |
| | | | 704/254 |
| 2011/0218804 A1 | 9/2011 | Chun | |
| 2015/0235651 A1* | 8/2015 | Sharifi | G10L 15/222 |
| | | | 704/233 |
| 2017/0301347 A1* | 10/2017 | Fuhrman | G10L 15/063 |
| 2018/0330737 A1* | 11/2018 | Paulik | G10L 15/063 |

* cited by examiner

FIG.3

| PHONEMIC TRANSCRIPTION | READING IN KANA | WORD | WORD CODE |
|---|---|---|---|
| ... | ... | ... | ... |
| [s] [e] [i] [k] [o] | seiko | seiko (success) | 108001h |
| ... | ... | ... | ... |
| [s] [e] [i] [k] [o] | seiko | seiko (elaborate) | 108004h |
| ... | ... | ... | ... |

| WORD CODE (143a) | CO-OCCURRENCE SENTENCE VECTOR (CO-OCCURRENCE RATE) (143b) | ... | CO-OCCURRENCE SENTENCE VECTOR (CO-OCCURRENCE RATE) |
|---|---|---|---|
| ... | ... | ... | ... |
| 108001h | V108F97 (37%) | ... | V108D19 (29%) |
| ... | ... | ... | ... |
| 108004h | Vyyyyy (25%) | ... | Vzzzzz (31%) |
| ... | ... | ... | ... |

| PHONEMIC SIGN (144a) | CO-OCCURRENCE PHONEMIC SIGN (CO-OCCURRENCE RATE) (144b) | ... | CO-OCCURRENCE PHONEMIC SIGN (CO-OCCURRENCE RATE) |
|---|---|---|---|
| [k] | ... | ... | ... |
| [s] | [a] (37%) | ... | [i] (13%) |
| [t] | ... | ... | ... |
| [n] | ... | ... | ... |
| ... | ... | ... | ... |

FIG.5

| WORD NUMBER → | ← 1 → | | | | | | | | | | | ← 4 → | | | | | |
|---|---|---|---|---|---|---|---|---|---|---|---|---|---|---|---|---|---|
| OFFSET → 12 | 6 | 7 | 8 | 9 | 10 | 1 | 2 | 3 | 4 | 5 | 6 | 7 ⋯ 20 ⋯ | 4 | 5 | 6 | 7 | 8 | 9 ⋯ |

| WORD NUMBER (148a) | WORD CODE (148b) | OFFSET (148c) |
|---:|---:|---:|
| 0 | 108000h | 0 |
| 1 | 108001h | 6 |
| … | … | … |
| 4 | 108004h | 24 |
| … | … | … |
| n | | 85231 |

FIG.7

|     | 35 34 33 32 | 31 30 29 28 | 27 26 25 24 | 23 22 21 20 | 19 18 17 16 | 15 14 13 12 | 11 10 9 8 | 7 6 5 4 | 3 2 1 0 |      |
|-----|---|---|---|---|---|---|---|---|---|------|
| [s] | 0 0 0 0 | 0 0 0 0 | 0 0 0 0 | 0 0 0 1 | 0 0 0 0 | 1 0 0 0 | 0 1 0 1 | 0 0 0 0 | 0 1 0 0 | 0 0 0 0 | ~21 |

(with [o][k][i][e][s] ... [o][k][i][e][s] annotations)

| [e] | 0 0 0 0 | 0 0 0 0 | 0 0 0 0 | 0 0 1 0 | 0 0 0 1 | 0 0 0 0 | 1 0 1 0 | 0 0 0 0 | 1 0 0 0 | 0 0 0 0 | ~22 |
| [i] | 0 0 0 0 | 0 0 0 0 | 0 0 0 0 | 0 1 0 0 | 0 0 0 0 | 0 0 1 0 | 0 0 0 0 | 0 0 0 1 | 0 0 0 0 | 0 0 0 0 | ~23 |
| [k] | 0 0 0 0 | 0 0 0 0 | 0 0 0 0 | 1 0 0 0 | 0 0 1 0 | 0 0 0 0 | 0 0 0 0 | 0 0 1 0 | 0 0 0 0 | 0 0 0 0 | ~24 |
| [o] | 0 0 0 0 | 0 0 0 0 | 0 0 0 1 | 0 0 0 0 | 0 1 0 0 | 0 0 0 0 | 0 0 0 0 | 0 1 0 0 | 0 0 0 0 | 0 0 0 0 | ~25 |

⋮

| [t] | 0 0 0 0 | 0 0 0 0 | 0 0 0 0 | 0 0 0 0 | 0 0 0 0 | 0 0 0 1 | 0 0 0 0 | 0 0 0 0 | 0 0 0 0 | 0 0 0 0 | ~27 |

⋮

| <US> | 0 0 0 0 | 0 0 0 0 | 0 0 1 0 | 0 0 0 0 | 1 0 0 0 | 0 1 0 0 | 0 0 0 0 | 1 0 0 0 | 0 0 1 0 | 0 0 0 0 | ~30 |
| TOP  | 0 0 0 0 | 0 0 0 0 | 0 0 0 0 | 0 0 0 1 | 0 0 0 0 | 1 0 0 0 | 0 0 0 1 | 0 0 0 0 | 0 1 0 0 | 0 0 0 0 | ~31 |
| END  | 0 0 0 0 | 0 0 0 0 | 0 0 0 1 | 0 0 0 0 | 0 1 0 0 | 0 0 1 0 | 0 0 0 0 | 0 1 0 0 | 0 0 0 0 | 0 0 0 0 | ~32 |

WORD NUMBER ←

|            | 31 30 29 28 | 27 26 25 24 | 23 22 21 20 | 19 18 17 16 | 15 14 13 12 | 11 10 9 8 | 7 6 5 4 | 3 2 1 0 |
|------------|---|---|---|---|---|---|---|---|
| [s] UPPER  | 0 0 0 0  0 0 0 0 | 0 0 0 0 | 0 0 0 0 | 0 0 0 0 | 0 0 0 0 | 0 1 0 0 | 0 0 0 1 | 0 0 1 0 | ~41 |

FIG.10

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|---|
| [s] | 0 | 0 | 0 | 0 | 0 | 0 | 0 | 1 | 0 | 0 | 0 | 0 | 1 | 0 | 0 | 0 | 0 | 1 | 0 | 1 | 0 | 0 | 0 | 0 | 0 | 0 | 1 | 0 | 0 | 0 | 0 | 0 | 21a |
|     | 0 | 0 | 0 | 0 | 0 | 0 | 0 | 1 | 0 | 0 | 0 | 0 | 1 | 0 | 0 | 0 | 0 | 1 | 0 | 1 | 0 | 0 | 0 | 0 | 0 | 0 | 1 | 0 | 0 | 0 | 0 | 0 | 21b |
| [e] | 0 | 0 | 0 | 0 | 0 | 0 | 0 | 0 | 0 | 0 | 0 | 1 | 0 | 0 | 0 | 0 | 1 | 0 | 1 | 0 | 0 | 0 | 0 | 0 | 1 | 1 | 0 | 0 | 0 | 0 | 0 | 0 | 22a |
|     | 0 | 0 | 0 | 0 | 0 | 0 | 0 | 0 | 0 | 0 | 0 | 1 | 0 | 0 | 0 | 0 | 1 | 0 | 1 | 0 | 0 | 0 | 0 | 0 | 1 | 1 | 0 | 0 | 0 | 0 | 0 | 0 | 22b |
| ⋮ | | | | | | | | | | | | | | | | | | | | | | | | | | | | | | | | | |
| <US> | 0 | 0 | 0 | 0 | 0 | 0 | 0 | 0 | 0 | 0 | 1 | 0 | 0 | 1 | 0 | 0 | 0 | 0 | 0 | 0 | 1 | 0 | 0 | 0 | 0 | 0 | 1 | 0 | 0 | 0 | 0 | 0 | 30a |
|      | 0 | 0 | 0 | 0 | 0 | 0 | 0 | 0 | 0 | 0 | 1 | 0 | 0 | 1 | 0 | 0 | 0 | 0 | 0 | 0 | 1 | 0 | 0 | 0 | 0 | 0 | 1 | 0 | 0 | 0 | 0 | 0 | 30b |

147

INFORMATION PROCESSING APPARATUS, OUTPUT CONTROL METHOD, AND COMPUTER-READABLE RECORDING MEDIUM

CROSS-REFERENCE TO RELATED APPLICATION

This application is based upon and claims the benefit of priority of the prior Japanese Patent Application No. 2018-045892, filed on Mar. 13, 2018, the entire contents of which are incorporated herein by reference.

FIELD

The embodiment discussed herein is related to a computer-readable recording medium and the like.

BACKGROUND

In voice recognition, in addition to a word dictionary including phonemic information, a phoneme hidden Markov model (HMM) and a word HMM have been used. The phoneme HMM stores therein co-occurrence information on phonemes for a phoneme in association with the phoneme, for example. The word HMM stores therein co-occurrence information on words for a word in association with the word, for example. In voice recognition, first, based on phonemes obtained from co-occurrence information spectrum analysis, maximum likelihood estimation of phonemes is performed by the phoneme HMM. Next, a word dictionary coupled with phonemes via a tree-structured index is referred to, and a word is estimated. In addition, the accuracy of voice recognition is improved by the word HMM (refer to Japanese Laid-open Patent Publication No. 2010-055020 and Japanese Laid-open Patent Publication No. 2011-180596, for example).

SUMMARY

According to an aspect of an embodiment, a non-transitory computer-readable recording medium stores therein an output control program that causes a computer to execute a process including: receiving a phoneme string for a text having a plurality of sentences; determining a sentence corresponding to a specific phoneme or a phoneme string included in the received phoneme string; referring to a storage that stores therein co-occurrence information on sentences for words in association with the words and determining a word the co-occurrence information on the determined sentence of which satisfies a standard among the words; changing the specific phoneme or the phoneme string included in the received phoneme string to the determined word to generate a text corresponding to the received phoneme string; and outputting the generated text.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram of an example of a data structure of dictionary data;

FIG. 4A is a diagram of an example of a data structure of a sentence hidden Markov model (HMM) data;

FIG. 4B is a diagram of an example of a data structure of a phoneme HMM data;

FIG. 5 is a diagram of an example of a data structure of array data;

FIG. 6 is a diagram of an example of a data structure of an offset table;

FIG. 7 is a diagram of an example of a data structure of an index;

FIG. 8 is a diagram of an example of a data structure of an upper index;

FIG. 10 is a diagram of an example of a data structure of index data;

DESCRIPTION OF EMBODIMENT

However, in the related techniques described above, the accuracy of voice recognition may unfortunately degrade when a text including a plurality of sentences is voice-recognized.

In a plurality of sentences, a repeatedly occurring noun may be represented by being replaced by a pronoun, for example. When the pronoun is used, when a word present after the pronoun is voice-recognized, the word may be falsely recognized as a word having a different meaning although being the same in pronunciation (a homonym). In other words, voice recognition estimates the homonym in a maximum likelihood manner based on a word co-occurring in a sentence using the word HMM. However, when the word co-occurring with the homonym is replaced by the pronoun, estimation by the word HMM is unavailable. Consequently, when a text including a plurality of sentences is voice-recognized, the accuracy of voice recognition may degrade even when the word HMM is used.

Preferred embodiments will be explained with reference to accompanying drawings. This example does not limit this invention.

EXAMPLE

Determination Processing According to Example

Figure 1:
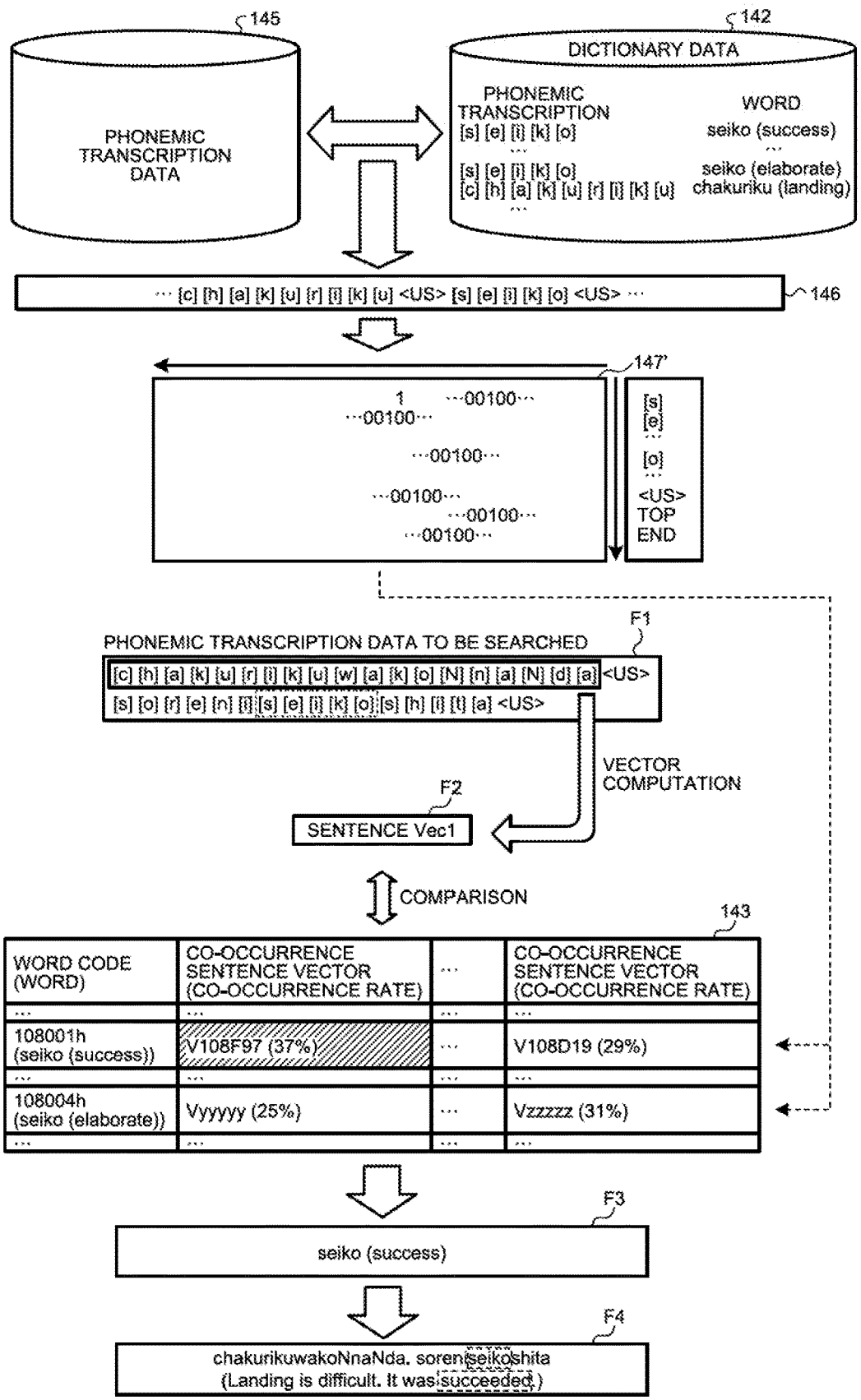
FIG. 1 is a diagram illustrating an example of processing by an information processing apparatus according to the present example.

FIG. 1 is a diagram illustrating an example of an information processing apparatus according to the present example. As illustrated in FIG. 1, upon acquiring phonemic transcription data F1 to be searched about voice recognition, the information processing apparatus estimates a word F3 corresponding to a specific phoneme string included in the phonemic transcription data F1 to be searched in a maximum likelihood manner based on an index 147' and sentence HMM data 143. The information processing apparatus transforms the specific phoneme string included in the phonemic transcription data F1 to be searched into the word F3 estimated in a maximum likelihood manner and outputs a text F4 corresponding to the phonemic transcription data F1 to be searched. The specific phoneme string referred to in this example refers to a phoneme string of homonyms, which are words having the same pronunciation and different meanings.

The phonemic transcription data F1 to be searched and phonemic transcription data 145 described below are pieces of data described in a sign string of phonemic signs. As an example, for the words "seiko (success)" and "seiko (elaborate)," the phonemic transcription is "seiko," in which each of "s," "e," "i," "k," and "o" is a phonemic sign. Here, phonemic sign has the same meaning as phonemic symbol.

The phonemic transcription data F1 to be searched and the phonemic transcription data 145 described below include "text." The text includes a plurality of "sentences." The text " . . . chakurikuwakoNnaNda. soreniseikoshita . . . ( . . . Landing is difficult. I succeeded in doing it . . . )" includes "chakurikuwakoNnaNda. (Landing is difficult.)" and "soreniseikoshita (I succeeded in doing it.)," for example.

The following first describes processing to generate the index 147' from the phonemic transcription data 145 by the information processing apparatus.

The information processing apparatus compares the phonemic transcription data 145 and dictionary data 142 with each other, for example. The dictionary data 142 is data that defines words (morphemes) and phonemic transcriptions in association with each other. The dictionary data 142 is dictionary data for use in voice recognition as well as dictionary data for use in morphological analysis.

The information processing apparatus scans the phonemic transcription data 145 from the top, extracts a phonemic sign string matching a phonemic transcription defined in the dictionary data 142, and stores the phonemic sign string in array data 146.

The array data 146 has the phonemic transcription of the phonemic sign string defined in the dictionary data 142 among the phonemic sign strings included in the phonemic transcription data 145. For separation between phonemic transcriptions, <US (unit separator)> is registered. When there have been successive matches of "c" "h" "a" "k" "u" "r" "i" "k" "u," "k" "o" "N" "n" "a" "N," and "s" "e" "i" "k" "o" registered in the dictionary data 142 by the comparison between the phonemic transcription data 145 and the dictionary data 142, the information processing apparatus generates the array data 146 illustrated in FIG. 1, for example.

Upon generating the array data 146, the information processing apparatus generates the index 147' corresponding to the array data 146. The index 147' is information that associates a phonemic sign and an offset with each other. The offset indicates the position of the corresponding phonemic sign present on the array data 146. When a phonemic sign "s" is present at the $n_1$th character from the top of the array data 146, for example, a flag "1" is set at the position of an offset $n_1$ in a row (bitmap) corresponding to the phonemic sign "s" of the index 147'.

The index 147' of the present example also associates the positions of "top" and "end" of phonemic transcriptions and "<US>" with the offset. The top of the phonemic transcription "s" "e" "i" "k" "o" is "s," whereas the end thereof is "o," for example. When the top "s" of the phonemic transcription "s" "e" "i" "k" "o" is present at the $n_2$th character from the top of the array data 146, a flag "1" is set at the position of an offset $n_2$ in a row corresponding to the top of the index 147'. When the end "o" of the phonemic transcription "s" "e" "i" "k" "o" is present at the $n_3$th character from the top of the array data 146, a flag "1" is set at the position of an offset $n_3$ in a row corresponding to the end of the index 147'.

When "<US>" is present at the $n_4$th character from the top of the array data 146, a flag "1" is set at the position of an offset $n_4$ in a row corresponding to "<US>" of the index 147'.

The information processing apparatus refers to the index 147' and can thereby grasp the positions of the phonemic signs included in the phonemic transcriptions included in the phonemic transcription data 145 and the top and the end of the phonemic transcriptions and the separation "<US>."

Next, upon receiving the phonemic transcription data F1 to be searched, the information processing apparatus performs voice recognition on the phonemic transcription data F1 to be searched in order from the top. In this process, the information processing apparatus determines a sentence corresponding to a specific phoneme string included in the phonemic transcription data F1 to be searched. The specific phoneme string is the phoneme string of homonyms. In other words, when performing voice recognition on a phoneme string, and the phoneme string matches a plurality of phonemic transcriptions of the dictionary data 142, the information processing apparatus determines that the phoneme string is a homonym. The information processing apparatus then determines a sentence corresponding to this phoneme string from the phonemic transcription data F1 to be searched. The sentence may be a sentence related to the sentence including this phoneme string. The sentence may be a sentence immediately before the sentence including this phoneme string, for example. As an example, it is assumed that the phonemic transcription data F1 to be searched is "'c' 'h' 'a' 'k' 'u' 'r' 'i' 'k' 'u' 'w' 'a' 'k' 'o' 'N' 'n' 'a' 'N' 'd' 'a' <US> 's' 'o' 'r' 'e' 'n' 'i' 's' 'e' 'i' 'k' 'k' 'o' 's' 'h' 'i' 't' 'a' <US>" (chakurikuwakoNnaNda. soreniseikoshita (Landing is difficult. I succeeded in doing it.)). It is assumed that a phoneme string included in the phonemic transcription data F1 to be searched is "s" "e" "i" "k" "o." This phoneme string is the phoneme string of homonyms representing "seiko (success)" and "seiko (elaborate)," for example, and is thus the specific phoneme string. "'c' 'a' 'k' 'u' 'r' 'i' 'k' 'u' 'w' 'a' 'k' 'o' 'N' 'n' 'a' 'N' 'd' <US>" (chakurikuwakoNnaNda. (Landing is difficult.)), which is the sentence related to the sentence including this phoneme string, is determined as the sentence corresponding to the specific phoneme string.

The information processing apparatus calculates a sentence vector of the determined sentence. When calculating the sentence vector, the information processing apparatus calculates the sentence vector by calculating word vectors of respective words included in the sentence and accumulating the word vectors of the respective words based on the Word2Vec technique. The Word2Vec technique performs processing to calculate the vectors of the respective words based on a relation between a word and another adjacent word. The information processing apparatus performs the above processing to generate vector data F2.

The information processing apparatus compares the sentence vector indicated by the vector data F2 and the sentence hidden Markov model (HMM) data 143 with each other to determine the sentence vector of a word corresponding to the specific phoneme string. The information processing apparatus determines a word indicated by the specific phoneme string "s" "e" "i" "k" "o" included in the phonemic transcription data F1 to be searched from the index 147', the array data 146, and the dictionary data 142, for example. As an example, the information processing apparatus searches a position in the array data 146 for the specific phoneme string "s" "e" "i" "k" "o" included in the phonemic transcription data F1 to be searched by referring to the index 147'. The information processing apparatus then determines the word of the specific phoneme string indicated at the searched position from the array data 146 and the dictionary data 142. In this example, it is assumed that "seiko (success)" and "seiko (elaborate)" have been determined as the word of the specific phoneme string. The information processing apparatus compares the sentence vector indicated by the vector data F2 and co-occurrence information (a co-occurrence sentence vector) corresponding to the determined word in the sentence HMM data 143 with each other to determine the co-occurrence sentence vector of a word corresponding to the specific phoneme string "s" "e" "i" "k" "o."

The sentence HMM data 143 associates a word and a plurality of co-occurrence sentence vectors with each other. The word of the sentence HMM data 143 is a word registered in the dictionary data 142, and this word determines the word corresponding to the specific phoneme string. The co-occurrence sentence vector is a sentence vector determined from a sentence co-occurring with the word.

The co-occurrence sentence vector is associated with a co-occurrence rate. When the word indicated by the phoneme string included in the phonemic transcription data F1 to be searched is "seiko (success)," for example, for the sentence co-occurring with this word, it is indicated that the probability of the sentence vector being "V108F97" is "37%," whereas the probability of the sentence vector being "V108D19" is "29%."

The information processing apparatus compares the sentence vector indicated by the vector data F2 and the co-occurrence sentence vectors of the sentence HMM data 143 with each other to determine a matching record. When the sentence vector indicated by the vector data F2 matches (or resembles) the co-occurrence sentence vector "V108F97," for example, the information processing apparatus determines (estimates in a maximum likelihood manner) the word "seiko (success)" as the word corresponding to the specific phoneme string "s" "e" "i" "k" "o" (the word F3).

The information processing apparatus transforms the specific phoneme string "s" "e" "i" "k" "o" included in the phonemic transcription data F1 to be searched into the determined word "seiko (success)" and outputs the text F4 corresponding to the phonemic transcription data F1 to be searched. In this example, "chakurikuwakoNnaNda. soreniseikoshita. (Landing is difficult. I succeeded in doing it.)" is output as the text F4.

As described above, the information processing apparatus calculates the sentence vector of the sentence corresponding to the specific phoneme string included in the phonemic transcription data F1 to be searched, compares the sentence vector and the co-occurrence sentence vectors of the sentence HMM data 143 with each other, and determines (estimates in a maximum likelihood manner) the word corresponding to the specific phoneme string. With this operation, the information processing apparatus determines the word corresponding to the specific phoneme string based on the co-occurrence relation between the sentence corresponding to the specific phoneme string included in the phonemic transcription data F1 to be searched and the sentence HMM data 143 and can thus improve the accuracy of voice recognition when a text including a plurality of sentences is voice-recognized. The information processing apparatus can improve the accuracy of voice recognition of a word corresponding to the phoneme string of homonyms, for example.

As an example, when the phonemic transcription data F1 to be searched is "'c' 'h' 'a' 'k' 'k' 'u' 'r' 'i' 'u' 'w' 'a' 'k' 'o' 'N' 'n' 'a' 'N' 'd' 'a' <US> 's' 'o' 'r' 'e' 'n' 'i' 's' 'e' 'i' 'k' 'k' 'o' 's' 'h' 'i' 'i' 't' 'a' <US>" (chakurikuwakoNnaNda. soreniseikoshita (Landing is difficult. I succeeded in doing it.)), based on the co-occurrence relation between the sentence "'c' 'h' 'a' 'k' 'u' 'r' 'i' 'k' 'u' 'w' 'a' 'k' 'o' 'N' 'n' 'a' 'N' 'd' 'a' <US>" (chakurikuwakoNnaNda. (Landing is difficult.)) corresponding to the phoneme string of homonyms "s" "e" "i" "k" "o" and the sentence HMM data 143, the word corresponding to the phoneme string of homonyms can be determined to be "seiko (success)," not "seiko (elaborate)."

As another example, when the phonemic transcription data F1 to be searched is "'t' 'o' 'k' 'i' 'w' 'a' 'c' 'h' 'i' 's' 'a' 'n' 'a' 'b' 'u' 'h' 'i' 'N' 'k' 'a' 'r' 'a' 'k' 'o' 's' 'e' 'i' 's' 'a' 'r' 'e' 't' 'e' 'i' 'r' 'u' <US> 's' 'o' 'r' 'e' 'w' 'a' 's' 'e' 'i' 'k' 'o' 'd' 'a' <US>" (tokeiwachisanabuhiNdeko:seisareteiru. sorewaseikoda. (A watch is made up of small parts. It is elaborate.)), based on the co-occurrence relation between the sentence "'t' 'o' 'k' 'e' 'i' 'w' 'a' 'c' 'h' 'i' 's' 'a' 'n' 'a' 'b' 'u' 'h' 'i' 'N' 'k' 'a' 'r' 'a' 'k' 'o' ':' 's' 'e' 'i' 's' 'a' 'r' 'e' 't' 'e' 'i' 'r' 'u' <US>" (tokeiwachisanabuhiNdeko: seisareteiru (A watch is made up of small parts.)) corresponding to the phoneme string of homonyms "s" "e" "i" "k" "o" and the sentence HMM data 143, the word corresponding to the phoneme string of homonyms can be determined to be "seiko (elaborate)," not "seiko (success)."

Figure 2:
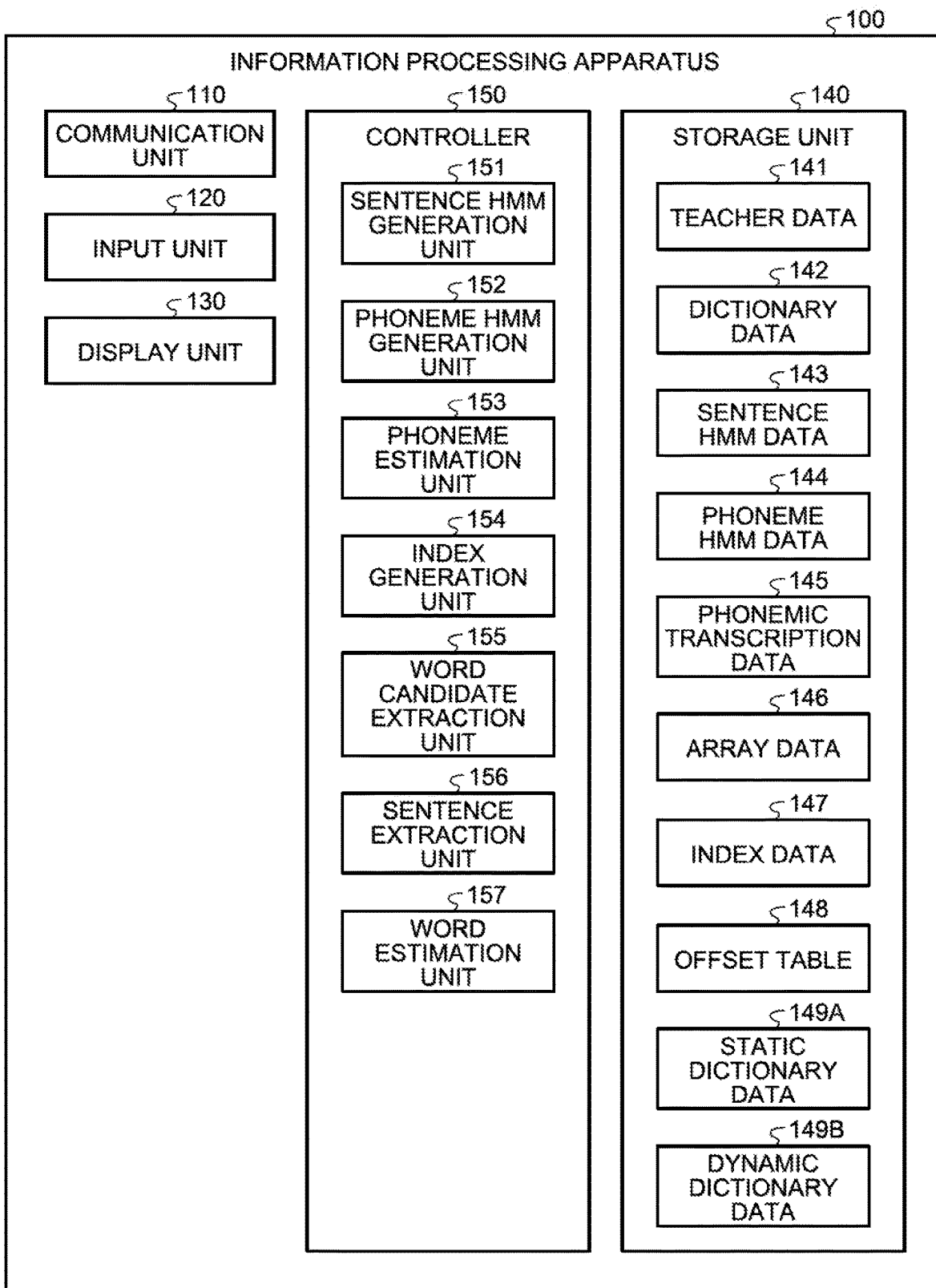
FIG. 2 is a functional block diagram of a configuration of the information processing apparatus according to the present example.

FIG. 2 is a functional block diagram of a configuration of the information processing apparatus according to the present example. As illustrated in FIG. 2, this information processing apparatus 100 has a communication unit 110, an input unit 120, a display unit 130, a storage unit 140, and a controller 150.

The communication unit 110 is a processing unit that communicates with another external apparatus via a network. The communication unit 110 corresponds to a communication apparatus. The communication unit 110 may receive teacher data 141, dictionary data 142, phonemic transcription data 145, and the like from the external apparatus and store them in the storage unit 140, for example.

The input unit 120 is an input apparatus for inputting various kinds of information to the information processing apparatus 100. The input unit 120 is a keyboard, a mouse, a touch panel, or the like, for example.

The display unit 130 is a display apparatus for displaying various kinds of information output from the controller 150. The display unit 130 is a liquid crystal display or a touch panel, for example.

The storage unit 140 has the teacher data 141, the dictionary data 142, the sentence HMM data 143, phoneme HMM data 144, the phonemic transcription data 145, the array data 146, index data 147, and an offset table 148. In addition, the storage unit 140 has static dictionary data 149A and dynamic dictionary data 149B. The storage unit 140 corresponds to a semiconductor memory element such as a flash memory or a storage apparatus such as a hard disk drive (HDD).

The teacher data 141 is data indicating large-volume natural sentences including homonyms. The teacher data 141 may be data of large-volume natural sentences such as a corpus, for example.

The dictionary data 142 is information that defines phonemic transcriptions and words to be dividable candidates (division candidates).

FIG. 3 is a diagram of an example of a data structure of the dictionary data. As illustrated in FIG. 3, the dictionary data 142 stores therein a phonemic transcription 142a, a reading in kana 142b, a word 142c, and a word code 142d in association with each other. The phonemic transcription 142a indicates a phonemic sign string for the word 142c. The phonemic sign string has the same meaning as a phonetic symbol string. The reading in kana 142b is the reading in kana of the word 142c. The word code 142d refers to a code encoded (an encoded code) uniquely representing a word unlike the character code string of the word 142c. The word code 142d indicates a shorter assigned code for a word having higher frequency of occurrence among words occurring in document data based on the teacher data 141, for example. The dictionary data 142 is generated in advance.

Referring back to FIG. 2, the sentence HMM data 143 is information that associates sentences and words with each other.

FIG. 4A is a diagram of an example of a data structure of a sentence HMM data. As illustrated in FIG. 4A, the sentence HMM data 143 stores therein a word code 143a that determines a word and a plurality of co-occurrence sentence vectors 143b in association with each other. The word code 143a is a code that determines the word registered in the dictionary data 142. The co-occurrence sentence vector 143b is associated with the co-occurrence rate. The co-occurrence sentence vector 143b is a vector determined from a sentence co-occurring with a word included in the teacher data 141. The co-occurrence rate indicates the probability of the word with the corresponding word code co-occurring with a sentence corresponding to a word to be searched. When the word code of the word corresponding to a certain sentence is "108001h," for example, it is indicated that the probability of the certain sentence and a sentence (a sentence with a sentence vector of "V108F97") co-occurring is "37%." The sentence HMM data 143 is generated by a sentence HMM generation unit 151 described below.

Referring back to FIG. 2, the phoneme HMM data 144 is information that associates phonemic signs and phonemic signs with each other.

FIG. 4B is a diagram of an example of a data structure of the phoneme HMM data. As illustrated in FIG. 4B, the phoneme HMM data 144 stores therein a phonemic sign 144a and a co-occurrence phonemic sign 144b in association with each other. The phonemic sign 144a corresponds to the phonemic symbol. The co-occurrence phonemic sign 144b refers to a phonemic sign co-occurring with a phonemic sign indicated by the phonemic sign 144a. The figure within the parentheses represents a co-occurrence rate. As an example, "s" indicated as the phonemic sign 144a co-occurs with "a" indicated as the co-occurrence phonemic sign 144b with a probability of 37%. "s" indicated as the phonemic sign 144a co-occurs with "i" indicated as the co-occurrence phonemic sign 144b with a probability of 13%. The phoneme HMM data 144 is generated by a phoneme HMM generation unit 152 described below.

Referring back to FIG. 2, the phonemic transcription data 145 is data of a phonemic sign string to be processed. In other words, the phonemic transcription data 145 is data of a phonetic symbol string obtained from a pronounced result to be processed. As an example, the phonemic transcription data 145 describes " . . . "c" "h" "a" "k" "u" "r" "i" "k" "u" "w" "a" "k" "o" "N" "n" "a" "N" "d" "a" <US> "s" "o" "r" "e" "n" "i" "s" "e" "i" "k" "o" "s" "h" "i" "t" "a" <US> . . . " ( . . . chakurikuwakoNnaNda. soreniseikoshita . . . ( . . . Landing is difficult. I succeeded in doing it . . . ). The parentheses are indicated by character strings.

Referring back to FIG. 2, the array data 146 has the phonemic transcriptions defined in the dictionary data 142 among the phonemic sign strings included in the phonemic transcription data 145.

FIG. 5 is a diagram of an example of a data structure of the array data. As illustrated in FIG. 5, the array data 146 separates the phonemic transcriptions by <US>. The figure indicated on the upper side of the array data 146 indicates an offset from a top "0" of the array data 146. The figure indicated on the upper side of the offset indicates a word number sequentially numbered from a word indicated by the top phonemic transcription of the array data 146.

Referring back to FIG. 2, the index data 147 is obtained by hashing the index 147' as described below. The index 147' is information that associates a phonemic sign and an offset with each other. The offset indicates the position of the phonemic sign present on the array data 146. When a phonemic sign "s" is present at the $n_1$th character from the top of the array data 146, for example, a flag "1" is set at the position of an offset $n_1$ in a row (bitmap) corresponding to the phonemic sign "s" of the index 147'.

The index 147' also associates the positions of "top" and "end" of phonemic transcriptions and "<US>" with the offset. The top of the phonemic transcription "s" "e" "i" "k" "o" is "s," whereas the end thereof is "o," for example. When the top "s" of the phonemic transcription "s" "e" "i" "k" "o" is present at the $n_2$th character from the top of the array data 146, a flag "1" is set at the position of an offset $n_2$ in a row corresponding to the top of the index 147'. When the end "o" of the phonemic transcription "s" "e" "i" "k" "o" is present at the $n_3$th character from the top of the array data 146, a flag "1" is set at the position of an offset $n_3$ in a row corresponding to "end" of the index 147'. When "<US>" is present at the $n_4$th character from the top of the array data 146, a flag "1" is set at the position of an offset $n_4$ in a row corresponding to "<US>" of the index 147'.

The index 147' is hashed as described below and is stored as the index data 147 in the storage unit 140. The index data 147 is generated by an index generation unit 154 described below.

Referring back to FIG. 2, the offset table 148 is a table that stores therein the offset corresponding to the top of each word from a top bitmap of the index data 147, the array data 146, and the dictionary data 142. The offset table 148 is generated when the index data 147 is restored.

FIG. 6 is a diagram of an example of a data structure of the offset table. As illustrated in FIG. 6, the offset table 148 stores therein a word number 148a, a word code 148b, and an offset 148c in association with each other. The word number 148a represents number numbered for the words indicated by the respective phonemic transcriptions on the array data 146 sequentially from the top. The word number 148a is indicated by figures numbered from "0" in ascending order. The word code 148b corresponds to the word code 142d of the dictionary data 142. The offset 148c represents the position (offset) of "top" of a phonemic transcription from the top of the array data 146. When a phonemic transcription "'s' 'e' 'i' 'k' 'o'" corresponding to a word code "108001h" is present at the first word from the top on the array data 146, for example, "1" is set as the word number. When the top "s" of the phonemic transcription "'s' 'e' 'i' 'k' 'o'" corresponding to the word code "108001h" is present at the sixth word from the top of the array data 146, "6" is set as the offset.

Referring back to FIG. 2, the static dictionary data 149A is information that associates words and static codes with each other.

The dynamic dictionary data 149B is information for assigning a dynamic code to a word (or a character string) that is not defined by the static dictionary data 149A.

Referring back to FIG. 2, the controller 150 has the sentence HMM generation unit 151, the phoneme HMM generation unit 152, a phoneme estimation unit 153, the index generation unit 154, a word candidate extraction unit 155, a sentence extraction unit 156, and a word estimation unit 157. The controller 150 can be implemented by a central processing unit (CPU), a micro processing unit (MPU), or the like. The controller 150 can also be implemented by a hard-wired logic such as an application specific integrated circuit (ASIC) or a field programmable gate array (FPGA). The word candidate extraction unit 155 is an example of a reception unit. The sentence extraction unit 156 is an example of a first determination unit. The word estimation unit 157 is an example of a second determination unit, a generation unit, and an output unit.

The sentence HMM generation unit 151 generates the sentence HMM data 143 based on the dictionary data 142 for use in morphological analysis and the teacher data 141.

The sentence HMM generation unit 151 encodes each word included in the teacher data 141 based on the dictionary data 142, for example. The sentence HMM generation unit 151 successively selects a word from a plurality of words included in the teacher data 141. The sentence HMM generation unit 151 determines a sentence included in the teacher data 141 corresponding to the selected word and calculates the sentence vector of the determined sentence. The sentence HMM generation unit 151 calculates a co-occurrence rate of the selected word and the sentence vector of the determined sentence. The sentence HMM generation unit 151 then associates the sentence vector of the determined sentence and the co-occurrence rate with the word code of the selected word and stores them in the sentence HMM data 143. The sentence HMM generation unit 151 repeatedly executes the above processing to generate the sentence HMM data 143. The word referred to in this example may be a CJK word or an English word.

The phoneme HMM generation unit 152 generates the phoneme HMM data 144 based on phoneme data. The phoneme HMM generation unit 152 successively selects a phonemic sign from a plurality of phonemic signs based on the phoneme data, for example. The phoneme HMM generation unit 152 calculates the co-occurrence rate of other phonemic signs included in the phoneme data for the selected phonemic sign. The phoneme HMM generation unit 152 then associates the other phonemic signs and the co-occurrence rate with the selected phonemic sign and stores them in the phoneme HMM data 144. The phoneme HMM generation unit 152 repeatedly executes the above processing to generate the phoneme HMM data 144.

The phoneme estimation unit 153 estimates a phonemic sign from a phoneme signal. The phoneme estimation unit 153 performs Fourier transformation on the phoneme data to perform spectral analysis and extracts voice features, for example. The phoneme estimation unit 153 estimates the phonemic sign based on the voice features. The phoneme estimation unit 153 verifies the estimated phonemic sign using the sentence HMM data 143. This verification is for improving the accuracy of the estimated phonemic sign. The phoneme data may be phonemic transcription data to be searched.

The index generation unit 154 generates the index data 147 based on the dictionary data 142 for use in morphological analysis. The index data 147 is data indicating a relative position of phonemic signs including each phonemic sign included in the phonemic transcription of the word registered in the dictionary data 142, a top phonemic sign of the phonemic transcription, and an end phonemic sign of the phonemic transcription.

The index generation unit 154 compares the phonemic transcription data 145 and the dictionary data 142 with each other, for example. The index generation unit 154 scans the phonemic transcription data 145 from its top and extracts a phonemic sign string that matches the phonemic transcription 142a registered in the dictionary data 142. The index generation unit 154 stores the matching phonemic sign string in the array data 146. When storing a phonemic sign string matching next in the array data 146, the index generation unit 154 sets <US> after the former character string and stores therein the phonemic sign string matching next after the set <US>. The index generation unit 154 repeatedly executes the above processing to generate the array data 146.

After generating the array data 146, the index generation unit 154 generates the index 147'. The index generation unit 154 scans the array data 146 from the top and associates the phonemic sign and the offset, the top of the phonemic sign string and the offset, the end of the phonemic sign string and the offset, and <US> and the offset with each other to generate the index 147'.

The index generation unit 154 associates the top of the phonemic sign string and the word number with each other to generate an upper index of the top of the phonemic sign string. With this operation, the index generation unit 154 generates the upper index corresponding to granularity of the word number or the like and can thereby speed up narrowing of an extraction area in subsequent extraction of a keyword.

FIG. 7 is a diagram of an example of a data structure of the index. FIG. 8 is a diagram of an example of a data structure of the upper index. As illustrated in FIG. 7, the index 147' has bitmaps 21 to 32 corresponding to phonemic signs, <US>, the top, and the end.

Bitmaps corresponding to phonemic signs "s," "e," "i," "k," "o,", . . . in the array data 146 " . . . [s] [e] [i] [k] [o] <US> . . . " are the bitmaps 21 to 25, for example. FIG. 7 omits illustration of bitmaps corresponding to other phonemic signs.

A bitmap corresponding to <US> is the bitmap 30. A bitmap corresponding to "top" of the phonemic transcription is the bitmap 31. A bitmap corresponding to "end" of the phonemic transcription is the bitmap 32.

In the array data 146 illustrated in FIG. 5, a phonemic sign "s" is present at offsets "6 and 24" of the array data 146, for example. Given this situation, the index generation unit 154 sets a flag "1" at the offsets "6 and 24" of the bitmap 21 of the index 147' illustrated in FIG. 7. The array data 146 also sets flags similarly for the other phonemic signs and <US>.

In the array data 146 illustrated in FIG. 5, the tops of the respective phonemic transcriptions are present at offsets "6 and 24" of the array data 146. Given this situation, the index generation unit 154 sets a flag "1" at offsets "6 and 24" of the bitmap 31 of the index 147' illustrated in FIG. 7.

In the array data 146 illustrated in FIG. 5, the ends of the respective phonemic transcriptions are present at "10 and 28" of the array data 146. Given this situation, the index generation unit 154 sets a flag "1" at offsets "10 and 28" of the bitmap 32 of the index 147' illustrated in FIG. 7.

As illustrated in FIG. 8, the index 147' has an upper bitmap corresponding to the top phonemic sign of each phonemic transcription. An upper bitmap corresponding to a top phonemic sign "s" is an upper bitmap 41, for example. In the array data 146 illustrated in FIG. 5, the top "s" of each phonemic transcription is present at word numbers "1 and 4" of the array data 146. Given this situation, the index generation unit 154 sets a flag "1" at the word numbers "1 and 4" of the upper bitmap 41 of the index 147' illustrated in FIG. 8.

Upon generation of the index 147', the index generation unit 154 hashes the index 147' to generate the index data 147 in order to reduce the data amount of the index 147'.

Figure 9:
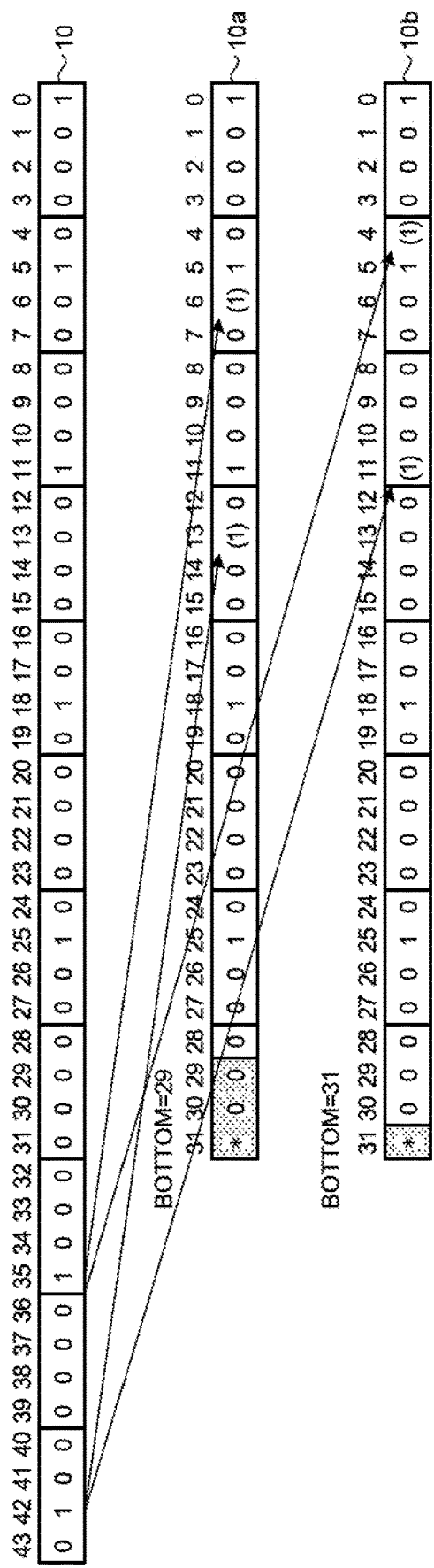
FIG. 9 is a diagram illustrating hashing of the index.

FIG. 9 is a diagram illustrating hashing of the index. The following describes a case in which the index includes a bitmap 10, and the bitmap 10 is hashed as an example.

The index generation unit 154 generates a bitmap 10a with a bottom 29 and a bitmap 10b with a bottom 31 from the bitmap 10, for example. The bitmap 10a sets separation for every offset 29 for the bitmap 10 and represents offsets with a flag "1" with the set separation as the top by flags of offsets 0 to 28 of the bitmap 10a.

The index generation unit 154 copies information on the offsets 0 to 28 of the bitmap 10 to the bitmap 10a. The index generation unit 154 processes information on offsets of 29 and later of the bitmap 10a as follows.

A flag "1" is set at an offset "35" of the bitmap 10. The offset "35" is an offset "29+6," and the index generation unit 154 sets a flag "(1)" at an offset "6" of the bitmap 10a. The first offset is set to 0. A flag "1" is set at an offset "42" of the bitmap 10. The offset "42" is an offset "29+13," and the index generation unit 154 sets an offset "(1)" at an offset "13" of the bitmap 10a.

The bitmap 10b sets separation for every offset 31 for the bitmap 10 and represents offsets with a flag "1" with the set separation as the top by flags of offsets 0 to 30 of the bitmap 10b.

The flag "1" is set at the offset "35" of the bitmap 10. The offset "35" is an offset "31+4," and the index generation unit 154 sets a flag "(1)" at an offset "4" of the bitmap 10b. The first offset is set to 0. The flag "1" is set at the offset "42" of the bitmap 10. The offset "42" is an offset "31+11," and the index generation unit 154 sets an offset "(1)" at an offset "11" of the bitmap 10b.

The index generation unit 154 executes the above processing to generate the bitmaps 10a and 10b from the bitmap 10. These bitmaps 10a and 10b are a result of hashing the bitmap 10.

The index generation unit 154 hashes the bitmaps 21 to 32 illustrated in FIG. 7, for example, to generate the index data 147 after being hashed. FIG. 10 is a diagram of an example of a data structure of the index data. When the bitmap 21 of the index 147' before being hashed illustrated in FIG. 7 is hashed, for example, a bitmap 21a and a bitmap 21b illustrated in FIG. 10 are generated. When the bitmap 22 of the index 147' before being hashed illustrated in FIG. 7 is hashed, a bitmap 22a and a bitmap 22b illustrated in FIG. 10 are generated. When the bitmap 30 of the index 147' before being hashed illustrated in FIG. 7 is hashed, a bitmap 30a and a bitmap 30b illustrated in FIG. 10 are generated. FIG. 10 omits illustration about other hashed bitmaps.

Figure 11:
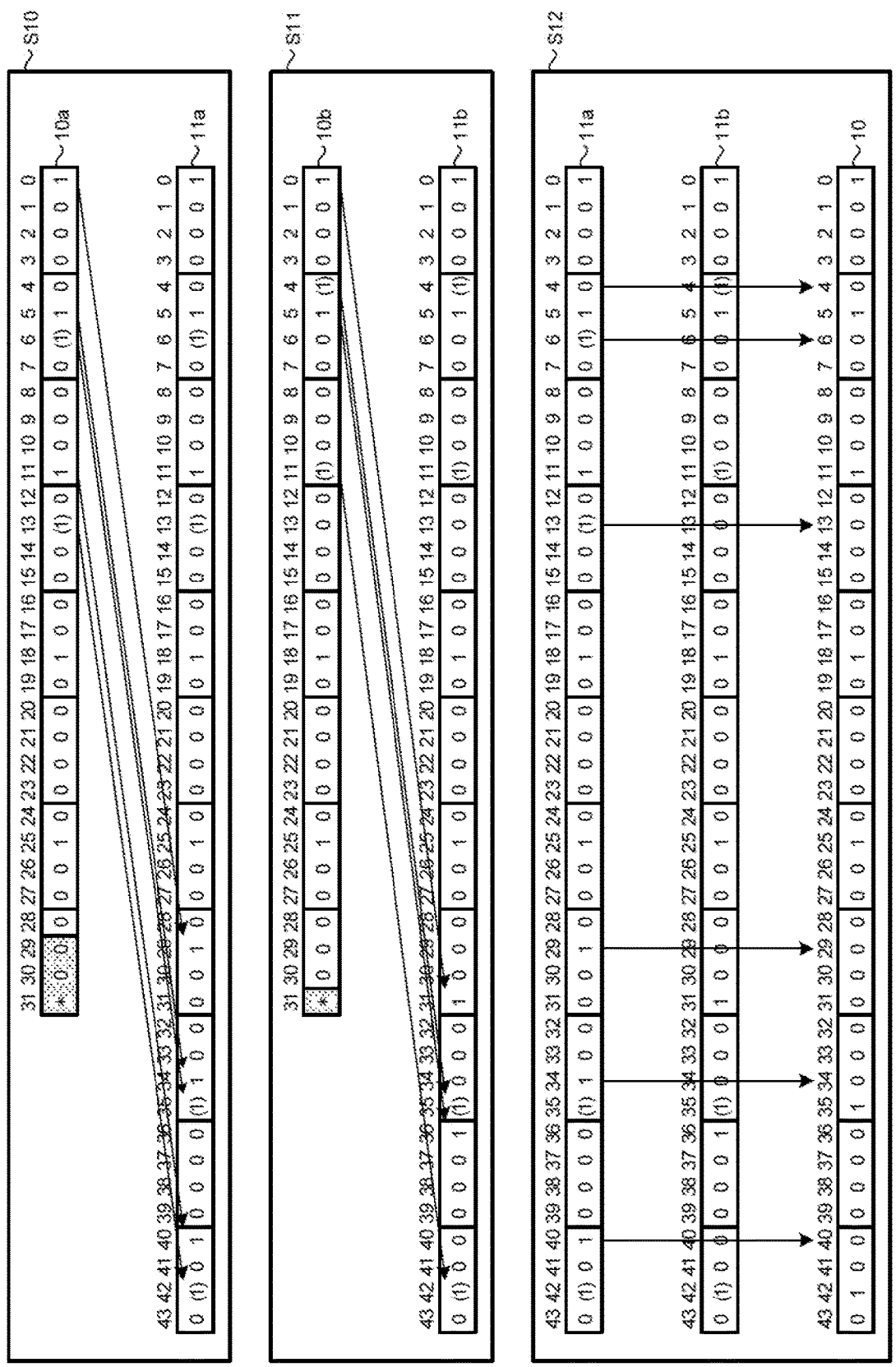
FIG. 11 is a diagram illustrating an example of processing to restore a hashed index.

The following describes processing to restore the hashed bitmap. FIG. 11 is a diagram illustrating an example of processing to restore the hashed index. The following describes processing to restore the bitmap 10 based on the bitmap 10a and the bitmap 10b as an example. The bitmaps 10, 10a, and 10b correspond to those illustrated in FIG. 9.

The following describes processing at Step S10. The restoration processing generates a bitmap 11a based on the bitmap 10a with a bottom 29. Information on the flag of offsets 0 to 28 of the bitmap 11a is similar to information on the flag of the offsets 0 to 28 of the bitmap 10a. Information on the flag of an offset 29 and later of the bitmap 11a is repetition of information on the flag of the offsets 0 to 28 of the bitmap 10a.

The following describes processing at Step S11. The restoration processing generates a bitmap 11b based on the bitmap 10b with a bottom 31. Information on the flag of offsets 0 to 30 of the bitmap 11b is similar to information on the flag of the offsets 0 to 30 of the bitmap 10b. Information on the flag of an offset 31 and later of the bitmap 11b is repetition of information on the flag of the offsets 0 to 30 of the bitmap 10b.

The following describes processing at Step S12. The restoration processing executes an AND operation of the bitmap 11a and the bitmap 11b to generate the bitmap 10. In the example illustrated in FIG. 11, the flag of the bitmap 11a and the bitmap 11b is "1" at offsets "0, 5, 11, 18, 25, 35, and 42." Given this situation, the flag of the offsets "0, 5, 11, 18, 25, 35, and 42" of the bitmap 10 is "1." This bitmap 10 is a restored bitmap. The restoration processing repeatedly executes similar processing for the other bitmaps to restore the bitmaps to generate the index 147'.

Referring back to FIG. 2, the word candidate extraction unit 155 is a processing unit that generates the index 147' based on the index data 147 and extracts corresponding word candidates for a phonemic transcription of homonyms included in phonemic transcription data to be searched based on the index 147'.

Figure 12:
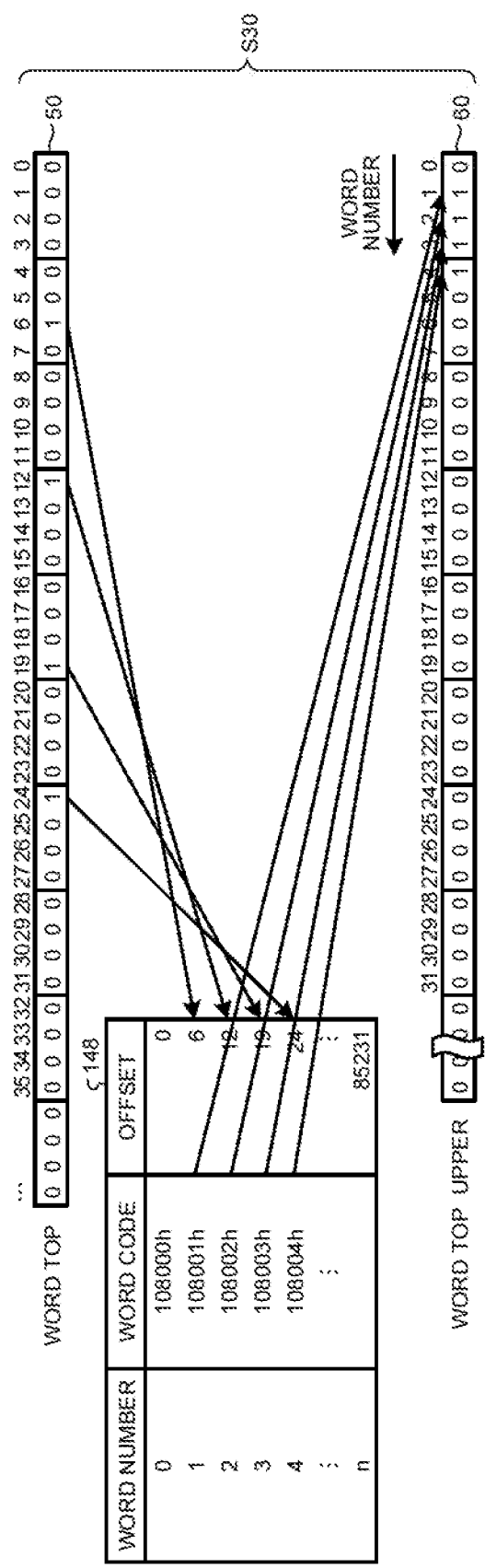
FIG. 12 is a diagram (1) illustrating an example of processing to extract a word candidate.
Figure 13:
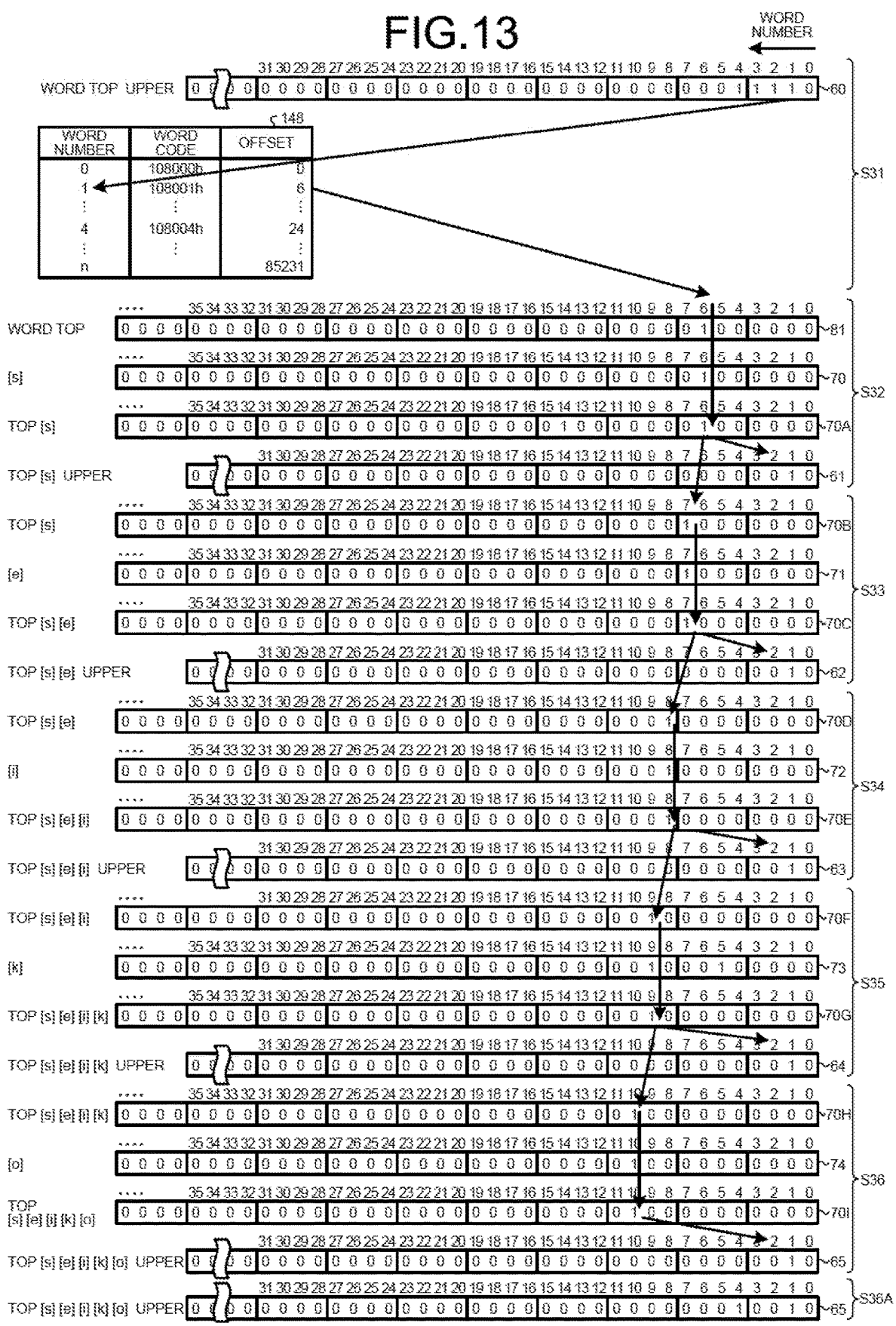
FIG. 13 is a diagram (2) illustrating an example of processing to extract a word candidate.

FIG. 12 and FIG. 13 are diagrams illustrating an example of processing to extract a word candidate. In the example illustrated in FIG. 12 and FIG. 13, the phonemic transcription data to be searched includes the phonemic transcription of homonyms "[s] [e] [i] [k] [o]." From the first phonemic sign of the phonemic transcription of homonyms in order, the bitmap of the corresponding phonemic sign is read from the index data 147, and the following processing is executed.

First, the word candidate extraction unit 155 reads a top bitmap from the index data 147 and restores the read bitmap. The top bitmap is a bitmap obtained by hashing the top bitmap 31 of the index 147' illustrated in FIG. 7. The restoration processing was illustrated in FIG. 11, and a description thereof is omitted. The word candidate extraction unit 155 generates the offset table 148 using the restored top bitmap, the array data 146, and the dictionary data 142.

The following describes Step S30. The word candidate extraction unit 155 determines an offset in which "1" is set in a restored top bitmap 50, for example. As an example, when "1" is set at an offset "6," the word candidate extraction unit 155 refers to the array data 146 to determine the phonemic transcription and the word number of the offset "6" and refers to the dictionary data 142 to extract the word code of the determined phonemic transcription. The word candidate extraction unit 155 then associates the word number, the word code, and the offset with each other and adds them to the offset table 148. The word candidate extraction unit 155 repeatedly executes the above processing to generate the offset table 148.

The word candidate extraction unit 155 then generates a top upper bitmap 60 corresponding to word granularity. The reason why the top upper bitmap 60 corresponding to the word granularity is generated is that objects to be processed are limited to speed up search. In this example, the word granularity is a 64-bit section from the top of the array data 146. The word candidate extraction unit 155 refers to the offset table 148 to determine the word number the offset of which is included in the 64-bit section and sets a flag "1" at the determined word number of the top upper bitmap 60. In this example, it is assumed that offsets "0, 6, 12, 19, and 24" are included in the 64-bit section. The word candidate extraction unit 155 then sets a flag "1" at word numbers "1, 2, 3, and 4" of the top upper bitmap 60.

The following describes Step S31. The word candidate extraction unit 155 determines a word number setting a flag "1" of the top upper bitmap 60, refers to the offset table 148, and determines the offset of the determined word number. The upper bitmap 60 indicates that a flag "1" is set at a word number "1" and the offset of the word number "1" is "6."

The following describes Step S32. The word candidate extraction unit 155 reads the bitmap of the first phonemic sign "s" of homonyms included in the phonemic transcription data to be searched and the top bitmap from the index data 147. The word candidate extraction unit 155 restores an area near the offset "6" for the read top bitmap and names the restored result bitmap 81. The word candidate extraction unit 155 restores an area near the offset "6" for the read bitmap of the phonemic sign "s" and names the restored result bitmap 70. As an example, only an area of bits "0" to "29" of a bottom part including the offset "6" is restored.

The word candidate extraction unit 155 executes an AND operation of the top bitmap 81 and the bitmap 70 of the phonemic sign "s" to determine the top position of the phonemic transcription. A result of the AND operation of the top bitmap 81 and the bitmap 70 of the phonemic sign "s" is named bitmap 70A. In the bitmap 70A, a flag "1" is set at an offset "6", which indicates that the offset "6" is the top of the phonemic transcription.

The word candidate extraction unit 155 corrects an upper bitmap 61 for the top and the phonemic sign "s." In the upper bitmap 61, the result of the AND operation of the top bitmap 81 and the bitmap 70 of the phonemic sign "s" is "1," and a flag "1" is set at the word number "1."

The following describes Step S33. The word candidate extraction unit 155 shifts the bitmap 70A for the top and the phonemic sign "s" leftward by one to generate a bitmap 70B. The word candidate extraction unit 155 reads the bitmap of the second phonetic sign "e" of the phonemic transcription data to be searched from the index data 147. The word candidate extraction unit 155 restores an area near an offset "6" for the read bitmap of the phonemic sign "e" and names the restored result bitmap 71. As an example, only an area of bottom bits "0" to "29" including the offset "6" is restored.

The word candidate extraction unit 155 executes an AND operation of the bitmap 70B for the top and the phonemic sign "s" and the bitmap 71 of the phonemic sign "e" to determine whether a phonemic sign string "s" "e" is present at the top in the word number "1." The result of the AND operation of the bitmap 70B for the top and the phonemic sign "s" and the bitmap 71 of the phonemic sign "e" is named bitmap 70C. In the bitmap 70C, a flag "1" is set at an offset "7," which indicates that the phonemic sign string "s" "e" is present at the top in the word number "1."

The word candidate extraction unit 155 corrects an upper bitmap 62 for the top and the phonemic sign string "s" "e." In the upper bitmap 62, the result of the AND operation of the bitmap 70B for the top and the phonemic sign "s" and the bitmap 71 of the phonemic sign "e" is "1," and a flag "1" is set at the word number "1."

The following describes Step S34. The word candidate extraction unit 155 shifts the bitmap 70C for the top and the phonemic sign string "s" "e" leftward by one to generate a bitmap 70D. The word candidate extraction unit 155 reads the bitmap of the third phonetic sign "i" of the phonemic transcription data to be searched from the index data 147. The word candidate extraction unit 155 restores an area near an offset "6" for the read bitmap of the phonemic sign "i" and names the restored result bitmap 72. As an example, only an area of bottom bits "0" to "29" including the offset "6" is restored.

The word candidate extraction unit 155 executes an AND operation of the bitmap 70D for the top and the phonemic sign string "s" "e" and the bitmap 72 of the phonemic sign "i" to determine whether a phonemic sign string "s" "e" "i" is present at the top in the word number "1." The result of the AND operation of the bitmap 70D for the top and the phonemic sign string "s" "e" and the bitmap 72 of the phonemic sign "i" is named bitmap 70E. In the bitmap 70E, a flag "1" is set at an offset "8," which indicates that the phonemic sign string "s" "e" "i" is present at the top in the top number "1."

The word candidate extraction unit 155 corrects an upper bitmap 63 for the top and the phonemic sign string "s" "e" "i." In the upper bitmap 63, the result of the AND operation of the bitmap 70D for the top and the phonemic sign string "s" "e" and the bitmap 72 of the phonemic sign "i" is "1," and a flag "1" is set at the word number "1."

The following describes Step S35. The word candidate extraction unit 155 shifts the bitmap 70E for the top and the phonemic sign string "s" "e" "i" leftward by one to generate a bitmap 70F. The word candidate extraction unit 155 reads the bitmap of the fourth phonetic sign "k" of the phonemic transcription data to be searched from the index data 147. The word candidate extraction unit 155 restores an area near an offset "6" for the read bitmap of the phonemic sign "k" and names the restored result bitmap 73. As an example, only an area of bottom bits "0" to "29" including the offset "6" is restored.

The word candidate extraction unit 155 executes an AND operation of the bitmap 70F for the top and the phonemic sign string "s" "e" "i" and the bitmap 73 of the phonemic sign "k" to determine whether a phonemic sign string "s" "e" "i" "k" is present at the top in the word number "1." The result of the AND operation of the bitmap 70F for the top and the phonemic sign string "s" "e" "i" and the bitmap 73 of the phonemic sign "k" is named bitmap 70G. In the bitmap 70G, a flag "1" is set at an offset "9," which indicates that the phonemic sign string "s" "e" "i" "k" is present at the top in the top number "1."

The word candidate extraction unit 155 corrects an upper bitmap 64 for the top and the phonemic sign string "s" "e" "i" "k." In the upper bitmap 64, the result of the AND operation of the bitmap 70F for the top and the phonemic sign string "s" "e" "i" and the bitmap 73 of the phonemic sign "k" is "1," and a flag "1" is set at the word number "1."

The following describes Step S36. The word candidate extraction unit 155 shifts the bitmap 70G for the top and the phonemic sign string "s" "e" "i" "k" leftward by one to generate a bitmap 70H. The word candidate extraction unit 155 reads the bitmap of the fifth phonetic sign "o" of the phonemic transcription data to be searched from the index data 147. The word candidate extraction unit 155 restores an area near an offset "6" for the read bitmap of the phonemic sign "o" and names the restored result bitmap 74. As an example, only an area of bottom bits "0" to "29" including the offset "6" is restored.

The word candidate extraction unit 155 executes an AND operation of the bitmap 70H for the top and the phonemic sign string "s" "e" "i" "k" and the bitmap 74 of the phonemic sign "o" to determine whether a phonemic sign string "s" "e" "i" "k" "o" is present at the top in the word number "1." The result of the AND operation of the bitmap 70H for the top and the phonemic sign string "s" "e" "i" "k" and the bitmap 74 of the phonemic sign "o" is named bitmap 70I. In the bitmap 70I, a flag "1" is set at an offset "10," which indicates that the phonemic sign string "s" "e" "i" "k" "o" is present at the top in the top number "1."

The word candidate extraction unit 155 corrects an upper bitmap 65 for the top and the phonemic sign string "s" "e" "i" "k" "o." In the upper bitmap 65, the result of the AND operation of the bitmap 70H for the top and the phonemic sign string "s" "e" "i" "k" and the bitmap 74 of the phonemic sign "o" is "1," and a flag "1" is set at the word number "1."

The word candidate extraction unit 155 also repeatedly executes the above processing for the other word numbers setting a flag "1" of the top upper bitmap 60 to generate (update) the upper bitmap 65 for the top and the phonemic sign string "s" "e" "i" "k" "o" (S36A). In other words, the upper bitmap 65 is generated, whereby the top and the word number of the word having the phonemic sign string "s" "e" "i" "k" "o" at the top are identified. In other words, the word candidate extraction unit 155 can determine positions within the array data 146 for the top and the phonemic sign string "s" "e" "i" "k" "o." That is, the word candidate extraction unit 155 extracts the top and a word candidate having the phonemic sign string "s" "e" "i" "k" "o" at the top.

Referring back to FIG. 2, the sentence extraction unit 156 extracts characteristic sentence data corresponding to the phonemic transcription of homonyms included in the phonemic transcription data to be searched. The sentence extraction unit 156 extracts sentence data related to sentence data including the phonemic transcription of homonyms as the characteristic sentence data from the phonemic transcription data to be searched, for example. As an example, the sentence extraction unit 156 extracts sentence data immediately before the sentence data including the phonemic transcription of homonyms as the characteristic sentence data from the phonemic transcription data to be searched.

The word estimation unit 157 estimates a word from the extracted word candidates based on the characteristic sentence data and the sentence HMM data 143. The sentence HMM data 143 is generated by the sentence HMM generation unit 151. The word estimation unit 157 performs processing to calculate a sentence vector from the characteristic sentence data and then estimates the word based on the calculated sentence vector and the sentence HMM data 143, for example.

Figure 14:
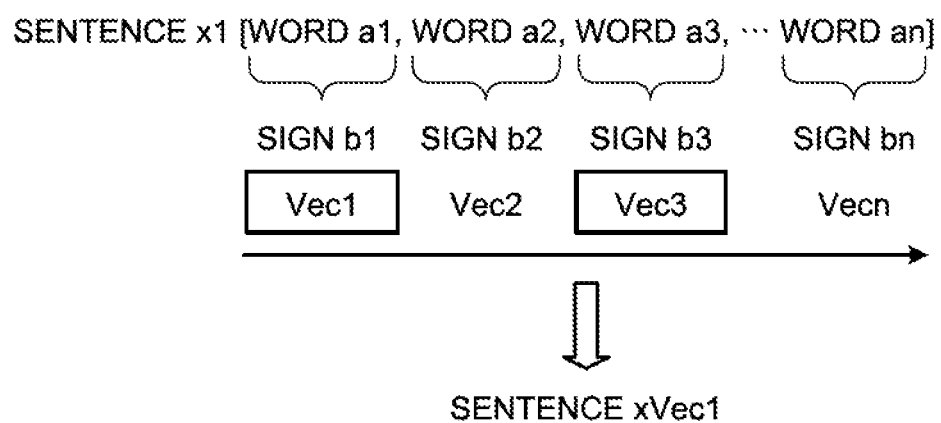
FIG. 14 is a diagram illustrating an example of processing to calculate a sentence vector.

The following describes an example of the processing to calculate the sentence vector by the word estimation unit 157 with reference to FIG. 14. FIG. 14 is a diagram illustrating an example of the processing to calculate the sentence vector. FIG. 14 illustrates processing to calculate a sentence vector xVec1 of a sentence x1 as an example.

The sentence x1 includes a word a1 to a word an, for example. The word estimation unit 157 encodes the words included in the sentence x1 using the static dictionary data 149A and the dynamic dictionary data 149B.

When the word matches the static dictionary data 149A, for example, the word estimation unit 157 determines the static code of the word and performs encoding by replacing the word with the determined static code. When the word does not match the static dictionary data 149A, the word estimation unit 157 determines a dynamic code using the dynamic dictionary data 149B. When the word is not registered in the dynamic dictionary data 149B, for example, the word estimation unit 157 registers the word in the dynamic dictionary data 149B to obtain the dynamic code corresponding to a registration position. When the word is already registered in the dynamic dictionary data 149B, the word estimation unit 157 obtains the dynamic code corresponding to a registration position already registered. The word estimation unit 157 performs encoding by replacing the word with the determined dynamic code.

In the example illustrated in FIG. 14, the word estimation unit 157 performs encoding by replacing the word a1 to the word an with signs b1 to bn.

The word estimation unit 157 performs encoding of the words and then calculates a word vector of each word (each sign) based on the Word2Vec technique. The Word2Vec technique performs processing to calculate the vectors of the respective signs based on a relation between a certain word (sign) and another adjacent word (sign). In the example illustrated in FIG. 14, the word estimation unit 157 calculates word vectors Vec1 to Vecn of the sign b1 to the sign bn. The word estimation unit 157 accumulates the word vectors Vec1 to Vecn to calculate the sentence vector xVec1 of the sentence x1.

The following describes an example of processing to estimate a word from the extracted word candidates based on the sentence vector and the sentence HMM data 143 by the word estimation unit 157. The word estimation unit 157 compares the sentence vector and the co-occurrence sentence vectors of the sentence HMM data 143 with each other to determine a co-occurrence sentence vector matching (or resembling) the sentence vector. The word estimation unit 157 may determine a co-occurrence sentence vector in which the distance between the sentence vector and the sentence HMM data 143 is less than a threshold as the matching co-occurrence sentence vector.

The word estimation unit 157 determines (estimates) a word associated with the determined co-occurrence sentence vector. The word estimation unit 157 then changes the phonemic transcription of homonyms included in the phonemic transcription data to be searched to the determined word to generate a text corresponding to the phonemic transcription data to be searched. The word estimation unit 157 then outputs the generated text.

Figure 15:
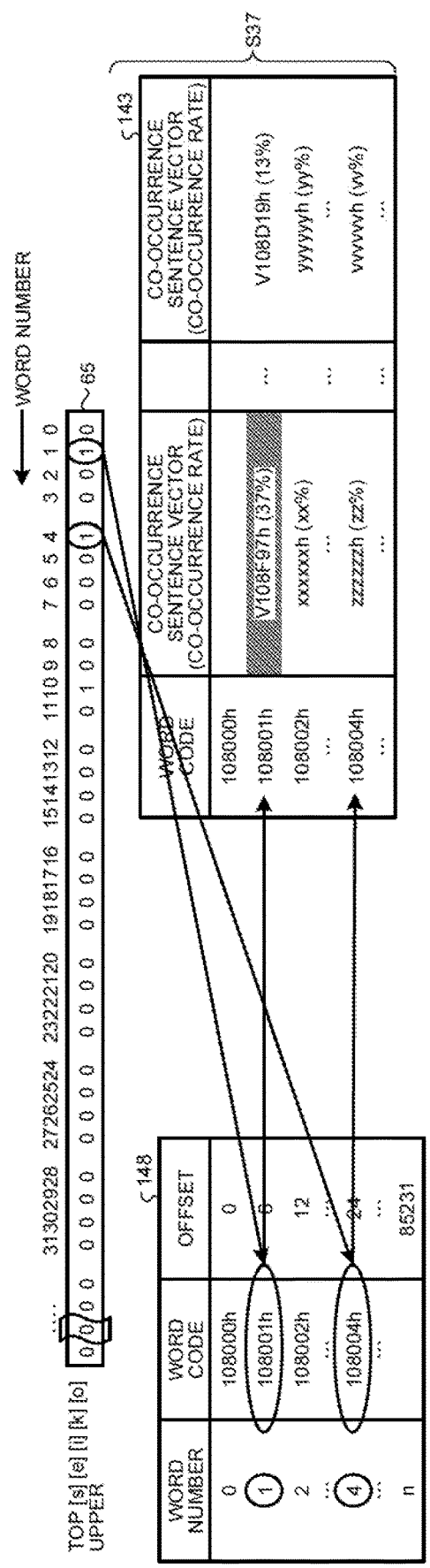
FIG. 15 is a diagram illustrating an example of processing for estimating a word.

FIG. 15 is a diagram illustrating an example of processing to estimate a word. In the example illustrated in FIG. 15, it is assumed that the word candidate extraction unit 155 has generated the upper bitmap 65 for the top and the phonemic sign string "s" "e" "i" "k" "o" as illustrated in S36A in FIG. 13.

The following describes Step S37 illustrated in FIG. 15. The word estimation unit 157 determines a word number setting "1" in the upper bitmap 65 for the top and the phonemic sign string "s" "e" "i" "k" "o." In this example, a flag "1" is set at a word number "1" and a word number "4,"

and the word number "1" and the word number "4" are determined. The word estimation unit 157 then acquires a word code corresponding to the determined word number from the offset table 148. In this example, "108001h" is acquired as the word code corresponding to the word number "108004h" is acquired as the word code corresponding to the word number "4." The word estimation unit 157 then determines a word corresponding to the acquired word code from the dictionary data 142. In other words, the word estimation unit 157 determines "seiko (success)" as the word corresponding to the word code "108001h" and determines "seiko (elaborate)" as the word corresponding to the word code "108004h."

In addition, the word estimation unit 157 compares the sentence vector and the co-occurrence sentence vector corresponding to the acquired word code in the sentence HMM data 143 with each other to determine the co-occurrence sentence vector matching (or resembling) the sentence vector. The word estimation unit 157 determines (estimates) a word indicated by the word code associated with the determined co-occurrence sentence vector. In this example, when the sentence vector of the sentence co-occurring with the sentence vector is "V108F97," the word estimation unit 157 determines (estimates) the word to be "seiko (success)."

When there are a plurality of co-occurrence sentence vectors matching the sentence vector, the word estimation unit 157 may select a co-occurrence sentence vector that maximizes the co-occurrence rate or select a co-occurrence sentence vector based on another selection policy.

Thus, when the phonemic transcription included in the phonemic transcription data to be searched is a homonym, the word estimation unit 157 uses the sentence vector of the sentence corresponding to this phonemic transcription and the sentence HMM and can thereby estimate an appropriate word among the word candidates corresponding to this phonemic transcription. Consequently, the word estimation unit 157 can improve the accuracy of voice recognition. In this example, when the phonemic transcription of homonyms is "s" "e" "i" "k" "o," "seiko (success)," "seiko (elaborate)," and the like are extracted as the word candidates. In this example, the word estimation unit 157 uses the sentence vector of the sentence before the sentence including the phonemic transcription "s" "e" "i" "k" "o" and the sentence HMM, thereby estimating the appropriate word "seiko (success)" from the word candidates "seiko (success)" and "seiko (elaborate)," and can thereby improve the accuracy of voice recognition.

The following describes an example of a processing procedure by the information processing apparatus 100 according to the present example.

Figure 16:
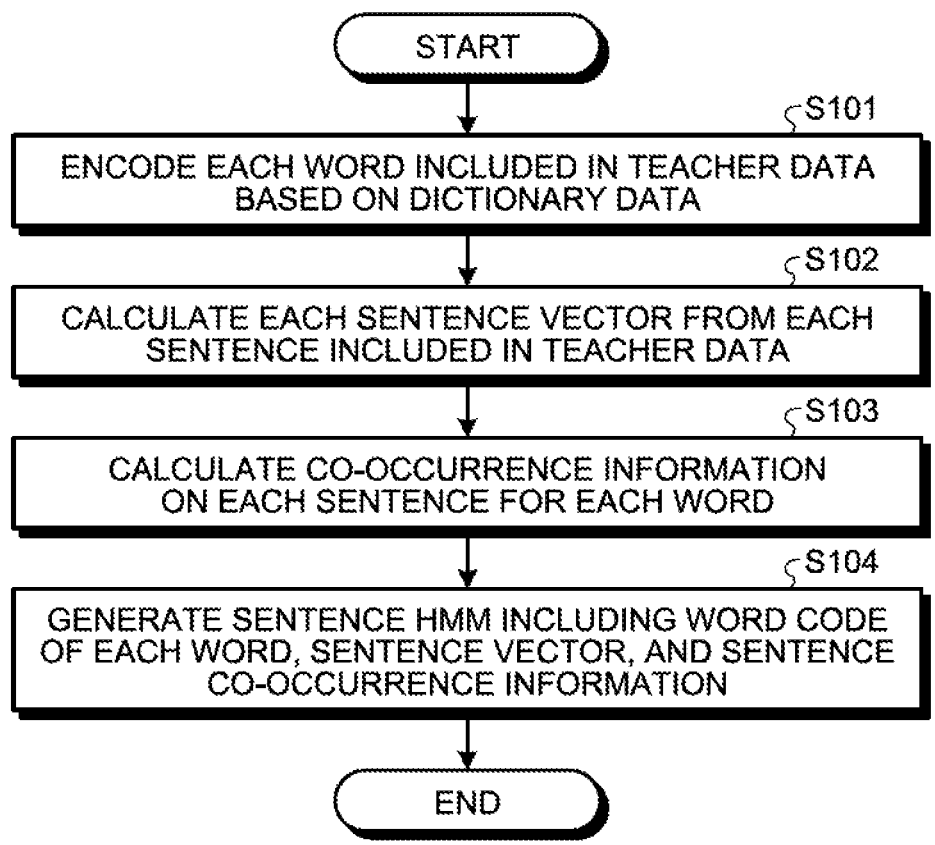
FIG. 16 is a flowchart of a processing procedure by a sentence HMM generation unit.

FIG. 16 is a flowchart of a processing procedure by the sentence HMM generation unit. As illustrated in FIG. 16, upon receiving the dictionary data 142 for use in morphological analysis and the teacher date 141, the sentence HMM generation unit 151 of the information processing apparatus 100 encodes each word included in the teacher data 141 based on the dictionary data 142 (Step S101).

The sentence HMM generation unit 151 calculates each sentence vector from each sentence included in the teacher date 141 (Step S102).

The sentence HMM generation unit 151 calculates co-occurrence information on each sentence for each word included in the teacher date 141 (Step S103).

The sentence HMM generation unit 151 generates the sentence HMM data 143 including the word code of each word, the sentence vector, and the sentence co-occurrence information (Step S104). In other words, the sentence HMM generation unit 151 associates the co-occurrence sentence vector and the co-occurrence rate with the word code of the word and stores them in the sentence HMM data 143.

Figure 17A:
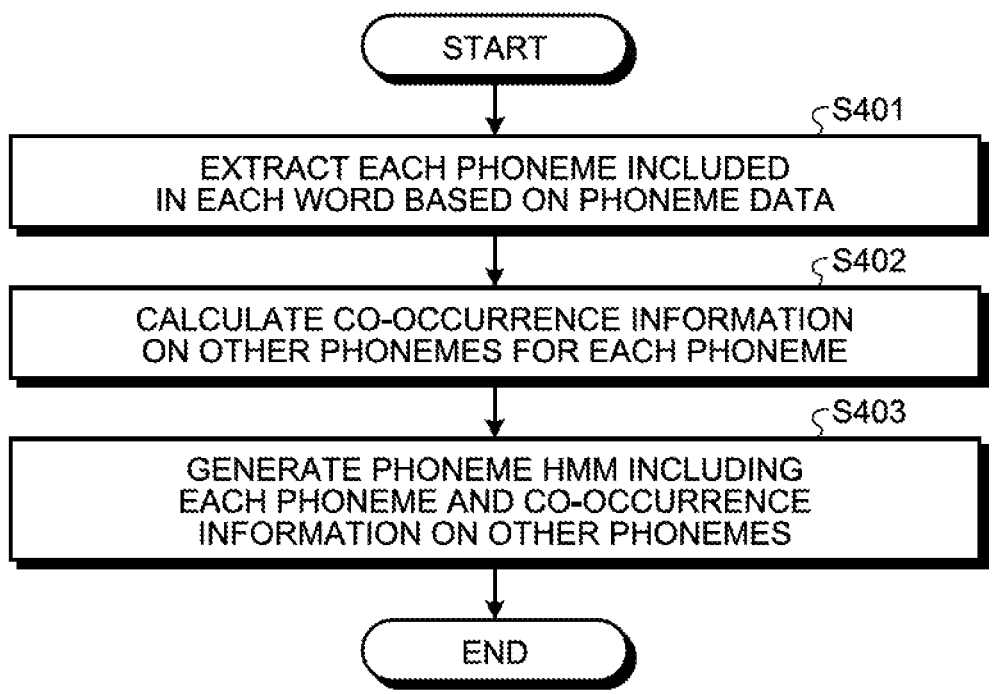
FIG. 17A is a flowchart of a processing procedure by a phoneme HMM generation unit.

FIG. 17A is a flowchart of a processing procedure by the phoneme HMM generation unit. The phoneme indicated in FIG. 17A corresponds to the phonemic sign. As illustrated in FIG. 17A, upon receiving phoneme data, the phoneme HMM generation unit 152 of the information processing apparatus 100 extracts each phoneme included in each word based on the phoneme data (Step S401).

The phoneme HMM generation unit 152 calculates co-occurrence information on other phonemes for each phoneme (Step S402).

The phoneme HMM generation unit 152 generates the phoneme HMM data 144 including each phoneme and the co-occurrence information on the other phonemes (Step S403). In other words, the phoneme HMM generation unit 152 generates the phoneme HMM data 144 including each phoneme, the other phonemes, and the co-occurrence rate.

Figure 17B:
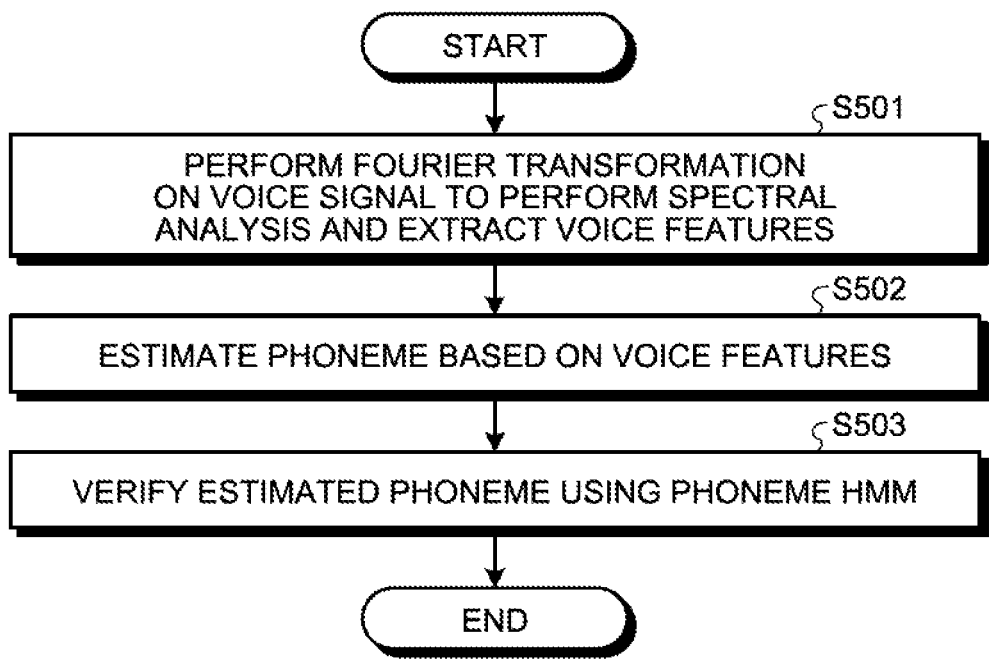
FIG. 17B is a flowchart of a processing procedure by a phoneme estimation unit.

FIG. 17B is a flowchart of a processing procedure by the phoneme estimation unit. The phoneme illustrated in FIG. 17B corresponds to the phonemic sign. As illustrated in FIG. 17B, upon receiving a phoneme signal (phoneme data), the phoneme estimation unit 153 of the information processing apparatus 100 performs Fourier transformation on the phoneme data to perform spectral analysis and extracts voice features (Step S501).

The phoneme estimation unit 153 estimates a phoneme based on the extracted voice features (Step S502). The phoneme estimation unit 153 verifies the estimated phoneme using the phoneme HMM data 144 (Step S503). This verification is for improving the accuracy of the estimated phonemic sign.

Figure 18:
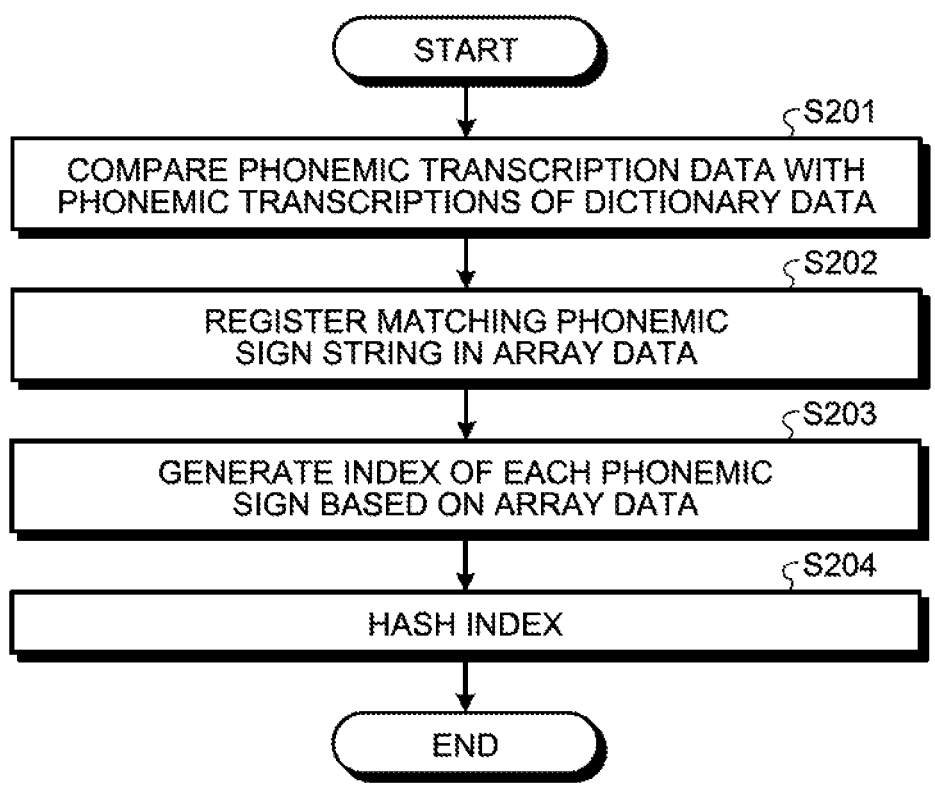
FIG. 18 is a flowchart of a processing procedure by an index generation unit.

FIG. 18 is a flowchart of a processing procedure by the index generation unit. As illustrated in FIG. 18, the index generation unit 154 of the information processing apparatus 100 compares the phonemic transcription data 145 and the phonemic transcriptions registered in the dictionary data 142 with each other (Step S201).

The index generation unit 154 registers a phonemic sign string matching the phonemic transcription 142a registered in the dictionary data 142 in the array data 146 (Step S202). The index generation unit 154 generates the index 147' of each phonemic sign based on the array data 146 (Step S203). The index generation unit 154 hashes the index 147' to generate the index data 147 (Step S204).

Figure 19:
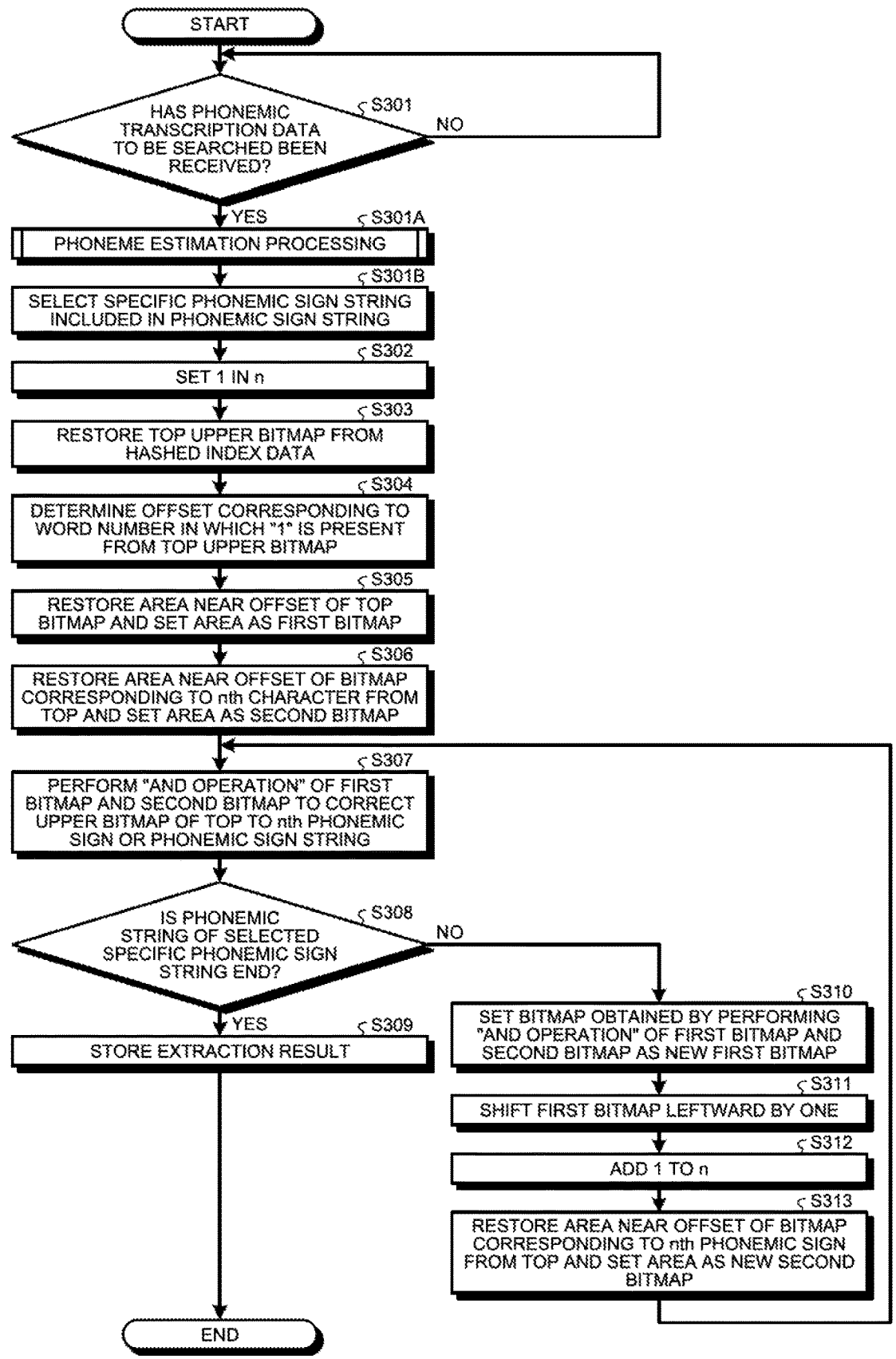
FIG. 19 is a flowchart of a processing procedure by a word candidate extraction unit.

FIG. 19 is a flowchart of a processing procedure by the word candidate extraction unit. As illustrated in FIG. 19, the word candidate extraction unit 155 of the information processing apparatus 100 determines whether the phonemic transcription data to be searched has been received (Step S301). If it is determined that the phonemic transcription data to be searched has not been received (No at Step S301), the word candidate extraction unit 155 repeats the determination processing until the phonemic transcription data to be searched has been received.

In contrast, if it is determined that the phonemic transcription data to be searched has been received (Yes at Step S301), the word candidate extraction unit 155 executes phoneme estimation processing for the phonemic transcription data (Step S301A). The phoneme estimation processing is processing by the phoneme estimation unit 153 illustrated in FIG. 17B. The word candidate extraction unit 155, upon execution of the phoneme estimation processing, selects a specific phonemic sign string included in a phonemic sign string as an execution result (Step S301B). The selected specific phonemic sign string referred to in this example refers to the phonemic sign string of homonyms. For the selected specific phonemic sign string, word candidate extraction processing is performed as follows.

The candidate extraction unit 155 sets 1 in a temporary area n (Step S302). The letter n represents the position of the selected specific phonemic sign string from the top. The candidate extraction unit 155 restores a top upper bitmap from the hashed index data 147 (Step S303). In this example, it is assumed that the offset table 148 has been generated.

The candidate extraction unit 155 refers to the offset table 148 to determine an offset corresponding to a word number in which "1" is present from the top upper bitmap (Step S304). The candidate extraction unit 155 then restores an area near the determined offset of the top bitmap and sets the area as a first bitmap (Step S305). The candidate extraction unit 155 restores an area near the determined offset of a bitmap corresponding to the nth character from the top of the selected specific phonemic sign string and sets the area as a second bitmap (Step S306).

The candidate extraction unit 155 performs an "AND operation" of the first bitmap and the second bitmap to correct the upper bitmap of the top to nth phonemic sign or phonemic sign string of the selected specific phonemic sign string (Step S307). When a result of the AND operation is "0," for example, the candidate extraction unit 155 sets a flag "0" at a position corresponding to the word number of the upper bitmap of the top to nth phonemic sign or phonemic sign string of the selected specific phonemic sign string to correct the upper bitmap. When the result of the AND operation is "1," the candidate extraction unit 155 sets a flag "1" at the position corresponding to the word number of the upper bitmap of the top to nth phonemic sign or phonemic sign string of the selected specific phonemic sign string to correct the upper bitmap.

The candidate extraction unit 155 determines whether the phonemic sign of the selected specific phonemic sign string is the end (Step S308). If it is determined that the phonemic sign of the selected specific phonemic sign string is the end (Yes at Step s308), the candidate extraction unit 155 stores an extraction result in the storage unit 140 (Step S309). In this example, the candidate extraction unit 155 stores the upper bitmap of the selected specific phonemic sign string as the extraction result in the storage unit 140. The candidate extraction unit 155 then ends the word candidate extraction processing. In contrast, if it is determined that the phonemic sign of the selected specific phonemic sign string is not the end (No at Step S308), the candidate extraction unit 155 sets a bitmap obtained by performing the "AND operation" of the first bitmap and the second bitmap as a new first bitmap (Step S310).

The candidate extraction unit 155 shifts the first bitmap leftward by one bit (Step S311). The candidate extraction unit 155 adds 1 to the temporary area n (Step S312). The candidate extraction unit 155 restores an area near an offset of a bitmap corresponding to the nth phonemic sign from the top of the selected specific phonemic sign string and sets the area as a new second bitmap (Step S313). The candidate extraction unit 155 then shifts the process to Step S307 in order to perform the AND operation of the first bitmap and the second bitmap.

Figure 20:
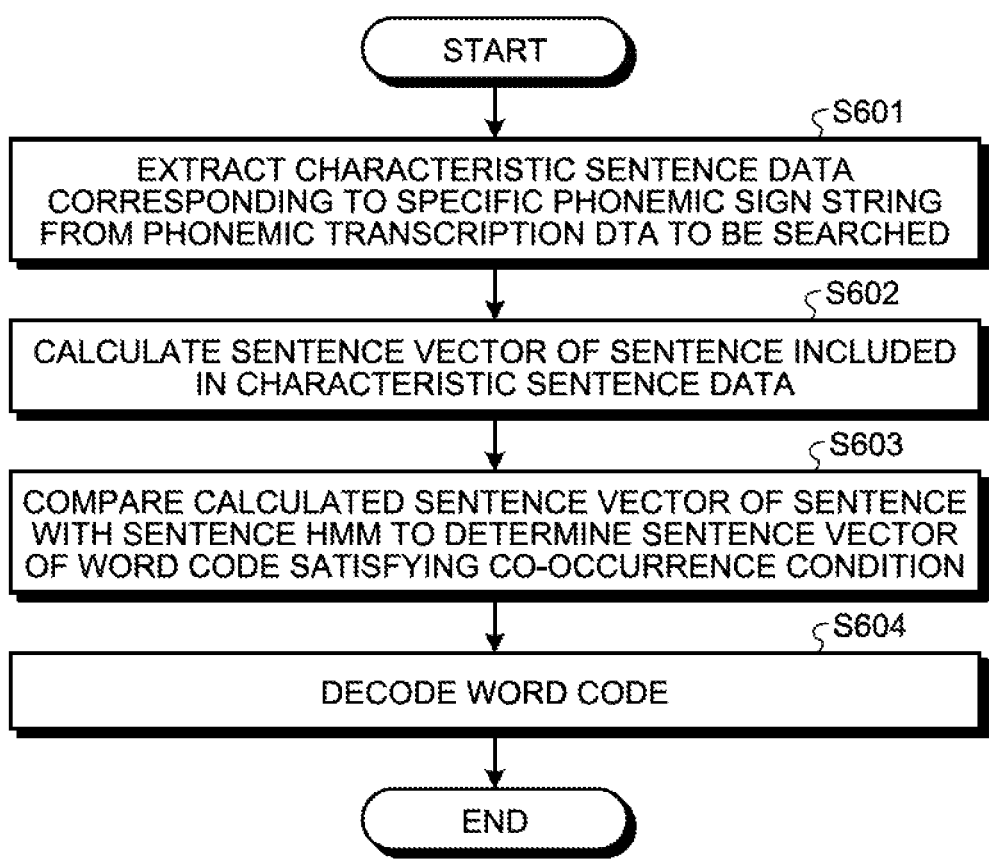
FIG. 20 is a flowchart of a processing procedure by a word estimation unit.

FIG. 20 is a flowchart of a processing procedure by the word estimation unit. In this example, the upper bitmap of the specific phonemic sign string is stored as the extraction result extracted by the candidate extraction unit 155, for example.

As illustrated in FIG. 20, the sentence extraction unit 156 of the information processing apparatus 100 extracts the characteristic sentence data corresponding to the specific phonemic sign string from the phonemic transcription data to be searched (Step S601). The sentence extraction unit 156 extracts sentence data related to sentence data including the specific phonemic sign string as the characteristic sentence data from the phonemic transcription data to be searched, for example. As an example, the sentence extraction unit 156 extracts sentence data immediately before the sentence data including the specific phonemic sign string as the characteristic sentence data from the phonemic transcription data to be searched.

The sentence extraction unit 156 calculates the sentence vector of a sentence included in the characteristic sentence data (Step S602). The word estimation unit 157 of the information processing apparatus 100 compares the calculated sentence vector of the sentence and the sentence HMM data 143 with each other to determine the sentence vector of a word code satisfying a co-occurrence condition (Step S603).

The word estimation unit 157 then refers to the dictionary data 142 to decode the word code (Step S604). In other words, the word estimation unit 157 estimates the word of the specific phonemic sign string in a maximum likelihood manner. The word estimation unit 157 then changes the specific phoneme string included in the phonemic transcription data to be searched to the word estimated in a maximum likelihood manner to generate a text corresponding to the phonemic transcription data to be searched. The word estimation unit 157 then outputs the generated text and ends the word estimation processing.

Effects of Example

The following describes effects of the information processing apparatus 100 according to the present example. The information processing apparatus 100 receives a phoneme string for a text having a plurality of sentences and determines a sentence corresponding to a specific phoneme or a phoneme string included in the received phoneme string. The information processing apparatus 100 refers to the sentence HMM data 143 that stores therein co-occurrence information on sentences for words in association with the words and determines a word the co-occurrence information on the determined sentence of which satisfies a standard among the words. The information processing apparatus 100 changes the specific phoneme or the phoneme string included in the received phoneme string to the determined word to generate a text corresponding to the received phoneme string. The information processing apparatus 100 outputs the generated text. With the configuration, the information processing apparatus 100, when a text including a plurality of sentences is voice-recognized, uses co-occurrence information for sentences corresponding to a specific phoneme or a phoneme string included in the text to determine a word for the specific phoneme or the phoneme string and can thereby improve the accuracy of voice recognition.

According to the above example, based on the index data 147 indicating a relative position of phonemic signs including each phonemic sign included in the phonemic transcription of the word registered in the common dictionary data 142 for use in voice analysis and morphological analysis, the top phonemic sign of the phonemic transcription, and the end phonemic sign of the phonemic transcription, the information processing apparatus 100 determines a phonemic transcription included in the specific phoneme or the phoneme string among the phoneme transcriptions of the words registered in the dictionary data 142, and determines word candidates corresponding to the determined phonemic transcription. The information processing apparatus 100 refers to information stored in the sentence HMM data 143 and determines a word the co-occurrence information on sentences of which satisfies a standard from the determined word candidates. With the configuration, the information processing apparatus 100 uses the index data 147 and the sentence HMM data 143 and can thereby efficiently perform determination of word candidates and maximum likelihood estimation of a word according to voice recognition.

According to the above example, the information processing apparatus 100 refers to the sentence HMM data 143 that stores therein co-occurrence information including vector information corresponding to sentences for words in association with the words to determine a word the co-occurrence information on the determined sentence of which satisfies a standard among the words. With the configuration, the information processing apparatus 100 determines a maximum likelihood word from the sentence vector using the sentence HMM data 143 associated with the vector information and can thus improve the accuracy of voice recognition.

According to the above example, the information processing apparatus 100 determines a sentence corresponding to a specific phoneme or a phoneme string for homonyms included in a phoneme string for a text having a plurality of sentences. The information processing apparatus 100 refers to the sentence HMM data 143 that stores therein co-occurrence information on sentences for words in association with the words and determines a word the co-occurrence information on the determined sentence of which satisfies a standard among the words. The information processing apparatus 100 changes the specific phoneme or the phoneme string included in the received phoneme string to the identified word to generate a text corresponding to the received phoneme string. With the configuration, when a text including a plurality of sentences is voice-recognized, the information processing apparatus 100 determines a word for homonyms included in a text using the sentence HMM data 143 and can thereby improve the accuracy of voice recognition.

The above example states that the sentence extraction unit 156 extracts sentence data corresponding to the phonemic transcription of homonyms included in the phonemic transcription data to be searched. However, not limited to this example, the sentence extraction unit 156 may have text data in place of the sentence data as the extracted data. Consequently, the word estimation unit 157 compares a text vector obtained by vectorizing the text data and co-occurrence text vectors of text HMM generated in place of the sentence HMM with each other to determine a co-occurrence text vector matching (or resembling) the text vector. The word estimation unit 157 then estimates a word corresponding to the determined co-occurrence text vector in a maximum likelihood manner. With this operation, the word estimation unit 157 changes the data corresponding to the phonemic transcription of homonyms from the sentence to the text, thereby increasing information related to the phonemic transcription of homonyms, and can thus further improve the accuracy of voice recognition of homonyms.

The above example describes a case in which the information processing apparatus 100 estimates a word corresponding to a Japanese phoneme string of homonyms in a maximum likelihood manner. However, not limited to this example, the information processing apparatus 100 may estimate a word corresponding to a phoneme string of homonyms of a language other than Japanese in a maximum likelihood manner. The information processing apparatus 100 may estimate a word corresponding to an English phoneme string of homonyms in a maximum likelihood manner, for example. In other words, the information processing apparatus 100 may calculate a sentence vector of a sentence corresponding to a specific phoneme string of homonyms included in the phonemic transcription data F1 to be searched indicated in English, compare the sentence vector and the co-occurrence sentence vectors of the sentence HMM data 143 with each other, and determine (estimate in a maximum likelihood manner) a word corresponding to the specific phoneme string.

Figure 21:
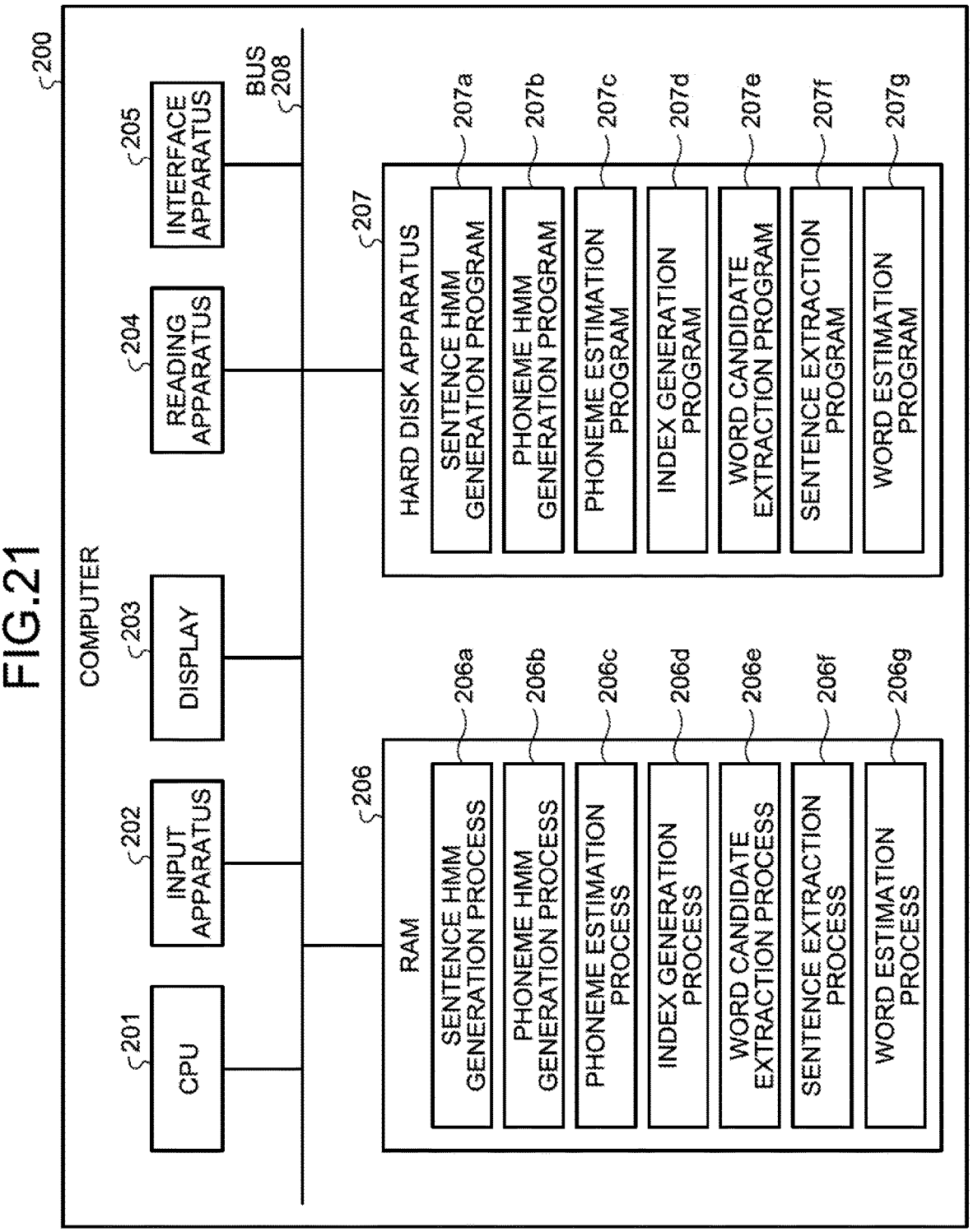
FIG. 21 is a diagram of an example of a hardware configuration of a computer implementing functions similar to those of the information processing apparatus.

The following describes an example of a hardware configuration of a computer implementing functions similar to those of the information processing apparatus 100 described in the above example. FIG. 21 is a diagram of the example of the hardware configuration of the computer implementing the functions similar to those of the information processing apparatus.

As illustrated in FIG. 21, this computer 200 has a CPU 201 that executes various kinds of computation processing, an input apparatus 202 receiving input of data from a user, and a display 203. The computer 200 also has a reading apparatus 204 that reads programs and the like from a storage medium and an interface apparatus 205 that exchanges data with another computer via a wired or wireless network. The computer 200 also has a random access memory (RAM) 206 that temporarily stores therein various kinds of information and a hard disk apparatus 207. The apparatuses 201 to 207 are connected to a bus 208.

The hard disk apparatus 207 has a sentence HMM generation program 207a, a phoneme HMM generation program 207b, a phoneme estimation program 207c, an index generation program 207d, a word candidate extraction program 207e, a sentence extraction program 207f, and a word estimation program 207g. The CPU 201 reads the various kinds of programs and develops them in the RAM 206.

The sentence HMM generation program 207a functions as a sentence HMM generation process 206a. The phoneme HMM generation program 207b functions as a phoneme HMM generation process 206b. The phoneme estimation program 207c functions as a phoneme estimation process 206c. The index generation program 207d functions as an index generation process 206d. The word candidate extraction program 207e functions as a word candidate extraction process 206e. The sentence extraction program 207f functions as a sentence extraction process 206f. The word estimation program 207g functions as a word estimation process 206g.

Processing by the sentence HMM generation process 206a corresponds to the processing by the sentence HMM generation unit 151. Processing by the phoneme HMM generation process 206b corresponds to the processing by the phoneme HMM generation unit 152. Processing by the phoneme estimation process 206c corresponds to the processing by the phoneme estimation unit 153. Processing by the index generation process 206d corresponds to the processing by the index generation unit 154. Processing by the word candidate extraction process 206e corresponds to the processing by the word candidate extraction unit 155. Processing by the sentence extraction process 206f corresponds to the processing by the sentence extraction unit 156. Processing by the word estimation process 206g corresponds to the processing by the word estimation unit 157.

The programs 207a to 207g are not necessarily stored in the hard disk apparatus 207 from the beginning. The programs are stored on a "portable physical medium" such as a flexible disk (FD), a compact disc recordable (CD-ROM), a digital versatile disc (DVD), a magnetooptical disc, or an IC card to be inserted into the computer 200, for example. The computer 200 may read and execute the programs 207a to 207g.

One aspect of the disclosure can improve the accuracy of voice recognition, when a text including a plurality of sentences is voice-recognized.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an output control program that causes a computer to execute a process comprising:
   receiving a phoneme signal for a text having a plurality of sentences;
   performing Fourier transformation on the received phoneme signal to perform spectral analysis and extracting voice features;
   estimating a phoneme string from the received phoneme signal based on the extracted voice features and registering a unit separator indicating separation between estimated phoneme strings;
   determining a sentence corresponding to a specific phoneme or the phoneme string included in the received phoneme signal;
   referring to a storage that stores therein co-occurrence information on sentences for words in association with the words and determining a word the co-occurrence information on the determined sentence of which satisfies a standard among the words, the co-occurrence information on sentences being information including vector information corresponding to the sentence, the vector information including a word vector that is calculated from an encoded word based on a Word2Vec technique and a sentence vector that is calculated by accumulating the word vectors corresponding to words included in a sentence corresponding to the sentence vector;
   changing the specific phoneme or the phoneme string included in the received phoneme signal to the determined word to generate a text corresponding to the received phoneme signal; and
   outputting the generated text.

2. The non-transitory computer-readable recording medium according to claim 1, wherein the determining includes, based on index information indicating a relative position of phonemic signs including each phonemic sign included in a phonemic transcription of a word registered in common dictionary data for use in voice analysis and morphological analysis, a top phonemic sign of the phonemic transcription, and an end phonemic sign of the phonemic transcription, determining a phonemic transcription included in the specific phoneme or the phoneme string among phonemic transcriptions of words registered in the dictionary data, determining word candidates corresponding to the determined phonemic transcription, referring to information stored in the storage, and determining a word the co-occurrence information on sentences of which satisfies a standard from the determined word candidates.

3. The non-transitory computer-readable recording medium according to claim 1, wherein the specific phoneme or the phoneme string included in the received phoneme signal is for homonyms.

4. An information processing apparatus comprising:
   a processor configured to:
      receive a phoneme signal for a text having a plurality of sentences;
      performing Fourier transformation on the received phoneme signal to perform spectral analysis and extracting voice features;
      estimating a phoneme string from the received phoneme signal based on the extracted voice features and registering a unit separator indicating separation between estimated phoneme strings;
      determine a sentence corresponding to a specific phoneme or the phoneme string included in the received phoneme signal;
      refer to a storage that stores therein co-occurrence information on sentences for words in association with the words and determine a word the co-occurrence information on the determined sentence of which satisfies a standard among the words, the co-occurrence information on sentences being information including vector information corresponding to the sentence, the vector information including a word vector that is calculated from an encoded word based on a Word2Vec technique and a sentence vector that is calculated by accumulating the word vectors corresponding to words included in a sentence corresponding to the sentence vector;
      change the specific phoneme or the phoneme string included in the received phoneme signal to the determined word to generate a text corresponding to the received phoneme signal; and
      output the text generated at the generating.

5. A output control method comprising:
   receiving a phoneme signal for a text having a plurality of sentences;
   performing Fourier transformation on the received phoneme signal to perform spectral analysis and extracting voice features;
   estimating a phoneme string from the received phoneme signal based on the extracted voice features and registering a unit separator indicating separation between estimated phoneme strings;
   determining a sentence corresponding to a specific phoneme or the phoneme string included in the received phoneme signal;
   referring to a storage that stores therein co-occurrence information on sentences for words in association with the words and determining a word the co-occurrence information on the determined sentence of which satisfies a standard among the words, the co-occurrence information on sentences being information including vector information corresponding to the sentence, the vector information including a word vector that is calculated from an encoded word based on a Word2Vec technique and a sentence vector that is calculated by accumulating the word vectors corresponding to words included in a sentence corresponding to the sentence vector;
   changing the specific phoneme or the phoneme string included in the received phoneme signal to the determined word to generate a text corresponding to the received phoneme signal, by a processor; and
outputting the generated text.

\* \* \* \* \*